United States Patent [19]

Wada et al.

[11] Patent Number: 5,414,448
[45] Date of Patent: May 9, 1995

[54] CHARACTER/PATTERN GENERATOR AND INFORMATION PROCESSING SYSTEM

[75] Inventors: Hiroshi Wada, Fujisawa; Yoshiaki Kitazume, Sayama; Kazuko Hasegawa; Shinji Wakisaka, both of Yokohama; Tsuneo Sato, Tanashi, all of Japan

[73] Assignee: Hitachi, Ltd., Tokyo, Japan

[21] Appl. No.: 938,760

[22] Filed: Sep. 1, 1992

[30] Foreign Application Priority Data

Sep. 3, 1991 [JP] Japan ................................. 3-223139

[51] Int. Cl.$^6$ ................................................ G09G 5/24
[52] U.S. Cl. .................................... 345/194; 345/126; 395/109
[58] Field of Search ............... 340/735, 739, 747, 750, 340/799, 728, 730, 790; 345/143, 194, 16, 189, 133, 192, 185, 126, 121, 135, 141, 144; 395/109, 110

[56] References Cited

U.S. PATENT DOCUMENTS

| | | | |
|---|---|---|---|
| 4,680,720 | 7/1987 | Yoshii et al. | 340/728 |
| 4,975,977 | 12/1990 | Kurosu et al. | 340/727 |
| 4,979,130 | 12/1990 | Li et al. | 340/730 |
| 5,018,883 | 5/1991 | Fujita | 340/790 |
| 5,063,375 | 11/1991 | Lien et al. | 340/728 |

FOREIGN PATENT DOCUMENTS

| | | | |
|---|---|---|---|
| 1-154294 | 6/1989 | Japan . | |
| 3-048373 | 7/1989 | Japan . | |
| 2-306298 | 5/1990 | Japan . | |
| 85011F | 8/1990 | Japan . | |
| 184393A | 7/1992 | Japan | 340/739 |

OTHER PUBLICATIONS

Nagashima, Ichiro et al. "Design of an Outline Font Rasterizing LSI," IEEE 1989, Custom Integrated Circuits Conference 9-2, pp. 117-118.

Morgan, Marc et al. "An ASIC for Outline Character Generation," 1991, Society for Ingromation Display 11.7, pp. 201-204.

TC8511F (Font Graphics Accelerator), Toshiba Technical Materials for Integrated Circuits, 1989.

*Primary Examiner*—Richard Hjerpe
*Assistant Examiner*—Lun-Yi Lao
*Attorney, Agent, or Firm*—Fay, Sharpe, Beall, Fagan, Minnich & McKee

[57] ABSTRACT

An information processing system having a character/-pattern generator, in which outline information of a character/pattern expressed in a vector form is subjected to any of at least two sorts of coordinate transformations in accordance with an address allocation scheme of an output engine to-be-used. Besides, in generating and transferring character/pattern data of dot form for each of the outline information items of character/pattern parts in subregions into which a region of the character/pattern has been divided, the outline information of the character/pattern is divided in either of horizontal and vertical directions in data transfer unit in accordance with the address allocation scheme of the output engine to-be-used. Further, in transferring the character/pattern data of the dot form, addresses are updated in conformity with any of at least two address update schemes in accordance with the address allocation scheme of the output engine to-be-used.

15 Claims, 18 Drawing Sheets

FIG. 7
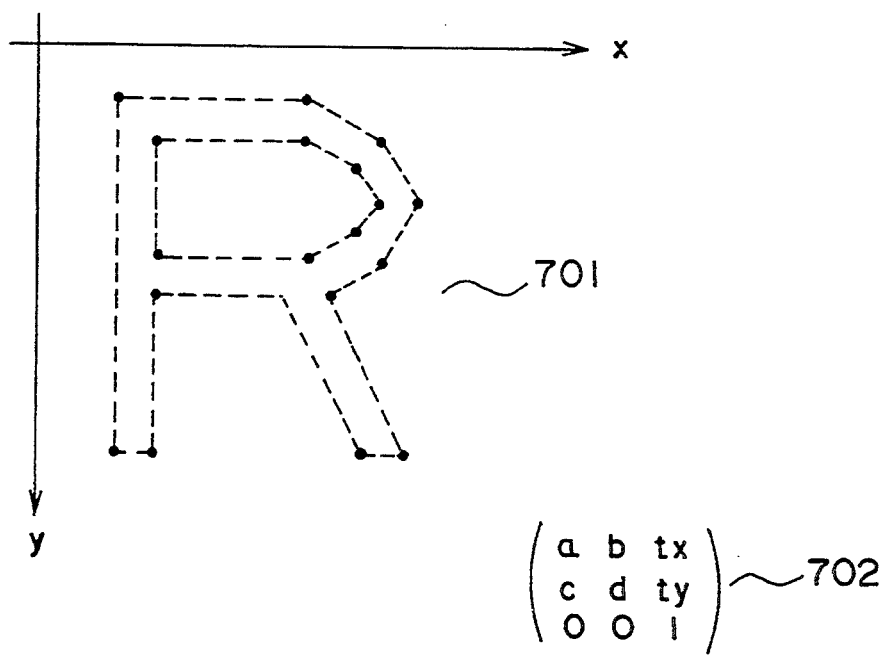
$$\begin{pmatrix} a & b & tx \\ c & d & ty \\ 0 & 0 & 1 \end{pmatrix} \sim 702$$
$X' = aX + bY + tx$
$Y' = cX + dY + ty$  ~703
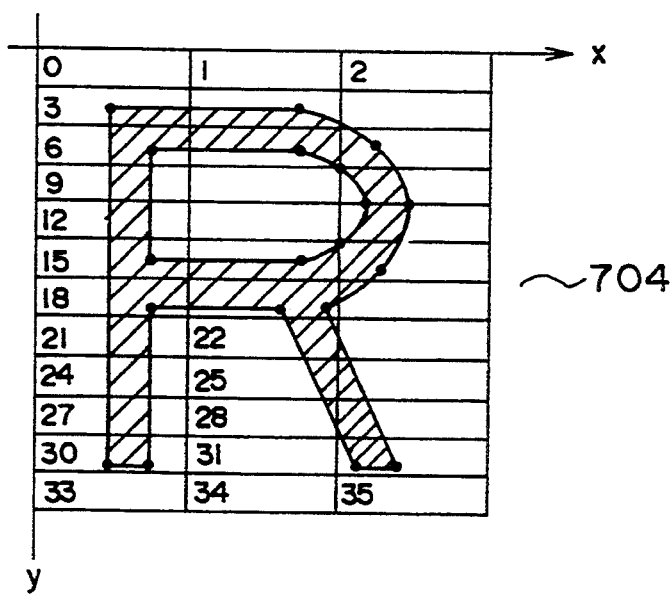

F I G. 1 7
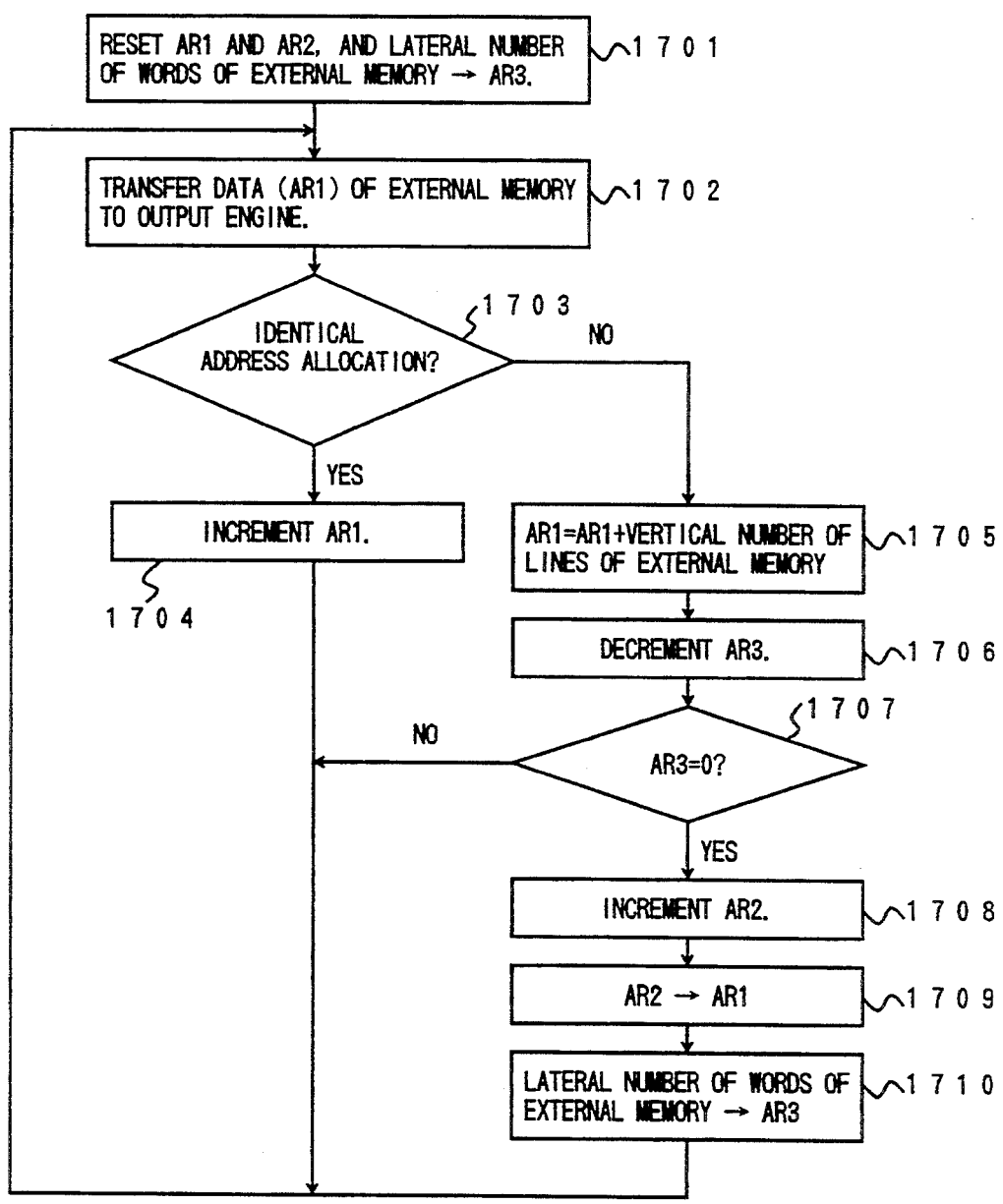

CHARACTER/PATTERN GENERATOR AND INFORMATION PROCESSING SYSTEM

BACKGROUND OF THE INVENTION

1. Field of the Invention

The present invention relates to an information processing system wherein data expressing a character, a pattern or the like in a dot form (hereinbelow, termed "bit map data") is generated from outline information expressing the outline of the character, the pattern or the like in a vector form (hereinbelow, termed "vector data"), and wherein the bit map data is printed out by an output engine such as a laser printer (hereinbelow, abbreviated to "LP") or thermal transfer printer (hereinbelow, abbreviated to ("TTP").

2. Description of the Prior Art

Heretofore, there has been a character/pattern generator which generates data expressive of the shape of a character or a pattern to be printed out by an output engine. With the character/pattern generator, bit map data is generated from vector data expressive of the outline of the character or the like and is stored in a built-in memory, and the bit map data stored in the built-in memory is transferred externally.

On this occasion, the vector data can be subjected to coordinate transformations such as enlargement, reduction, italicization or inclination, and rotation.

In addition, in a case where the bit map data to be generated has a size larger than the storage capacity of the built-in memory, the region of the vector data is divided into a few subregions, and bit map data items are generated from individual vector data items in the respective subregions and are transferred externally.

On this occasion, the division of the region into the subregions is done by a CPU. More specifically, the vector data is divided into the data transfer unit of the built-in memory (for example, into word units) in only the X direction of X-Y coordinates, or it is divided in any desired integral unit (in bit units) in both the X and Y directions of the X-Y coordinates.

Besides, in externally transferring the bit map data stored in the built-in memory, addresses are updated by being merely incremented. In general, the destination of the transfer is an external memory. After having been transferred to the external memory, the bit map data is further transferred to the output engine by the CPU.

With the prior art stated above, the coordinate transformations are always performed by executing calculations in predetermined forms. Therefore, it has not been considered to extensively apply the character/pattern generator to output engines whose address allocations are different from the address allocation of the built-in memory. This has led to the problem of narrow application.

Further, with the prior art, the bit map data stored in the built-in memory is externally transferred while the addresses are being incremented. Therefore, the bit map data left intact cannot be transferred to an output engine whose address allocation is different from the address allocation of the built-in memory. In other words, the application of the character/pattern generator to the output engine having the different address allocation scheme is not taken into consideration. This has also led to the problem of narrow application.

Still further, it is not considered in the prior art that, when the region of the vector data has been divided into the several subregions in any desired integral unit (in bit units) other than in the data transfer unit of the built-in memory (for example, in word units), in both the X and Y directions, a blank part containing no data appears within a word in the operation of transferring the bit map data stored in the built-in memory. This has led to the problem that several processes are required for deleting the blank part.

In this manner, with the prior art, the designs needs of character/pattern generators must be respectively different in accordance with the address allocations of output engines, and an information processing system which contains a single character/pattern generator cannot include various output engines of different address allocations.

SUMMARY OF THE INVENTION

An object of the present invention is to provide a character/pattern generator and an information processing system which can realize coordinate transformations applicable to various output engines without largely increasing circuits.

Another object of the present invention is to provide an information processing system which can realize regional divisions applicable to various output engines without largely increasing circuits.

Still another object of the present invention is to provide a character/pattern generator and an information processing system which can realize data transfers applicable to various output engines without largely increasing circuits.

The present invention for accomplishing the objects consists, in a character/pattern generator having coordinate transformation means for subjecting vector data to a coordinate transformation, and generation means for generating character/pattern data of dot form from the vector data coordinate-transformed by the coordinate transformation means, of the fact that the coordinate transformation means includes a coordinate transformation function of subjecting the vector data to any of two or more sorts of coordinate transformations by the use of coordinate transformation parameters externally given, and a coordinate transformation selection function of selecting any of the two or more sorts of coordinate transformations on the basis of information externally given.

Besides, in an information processing system having, at least, such a character/pattern generator, a CPU (central processing unit), and at least one sort of output engine; the CPU includes information bestowal means for giving the character/pattern generator the information which corresponds to an address allocation of the output engine to-be-used, and the coordinate transformation selection function selects any of the two or more sorts of coordinate transformations on the basis of the information given by the information bestowal means.

According to the present invention, in a case where a character/pattern generator comprises coordinate transformation means for subjecting vector data to one sort of coordinate transformation, and generation means for generating character/pattern data of dot form from the vector data coordinate-transformed by the coordinate transformation means, a CPU can include coordinate transformation parameter bestowal means for giving the character/pattern generator coordinate transformation parameters (elements of a 3×3 coordinate transformation matrix) which correspond to an address allocation of an output engine to-be-used.

According to the present invention, in an information processing system having, at least, a CPU and at least one sort of output engine together with a character/pattern generator including coordinate transformation means for subjecting vector data to a coordinate transformation, generation means for generating bit map data from the vector data coordinate-transformed by the coordinate transformation means, memory means for storing therein the bit map data generated by the generation means, and transfer means for externally transferring the bit map data stored in the memory means; the CPU can be constructed including regional division means and regional division selection means in a case where the generation means includes a function of generating bit map data items for respective vector data items in two or more divided subregions of a region of the vector data in order to generate the bit map data having a size larger than a storage capacity of the memory means, the regional division means performing either of two sorts of regional divisions which consist of a regional division of dividing the region of the vector data in an X direction in data transfer unit of the transfer means and a regional division of dividing the region of the vector data in a Y direction, the regional division selection means selecting either of the two sorts of regional divisions in accordance with an address allocation of the output engine to-be-used.

According to the present invention, in a character/pattern generator having coordinate transformation means for subjecting vector data to a coordinate transformation, generation means for generating bit map data from the vector data coordinate-transformed by the coordinate transformation means, memory means for storing therein the bit map data generated by the generation means, and transfer means for externally transferring the bit map data stored in the memory means; the transfer means can include an address update function of updating addresses in conformity with any of two or more address update schemes in transferring the bit map data stored in the memory means, and an address update selection function of selecting any of the two or more address update schemes on the basis of information externally given.

Besides, in an information processing system having, at least, such a character/pattern generator, a CPU, and at least one sort of output engine; the CPU includes information bestowal means for giving the character/pattern generator the information which corresponds to an address allocation of the output engine to-be-used, and the address update selection function selects any of the two or more sorts of address update schemes on the basis of the information given by the information bestowal means.

The information processing system of the present invention can be actually implemented in the form of a product such as a word processor or personal computer of the type having an incorporated printer, or as a printing system. In such a case, the transfer destination of the transfer means becomes the output engine to-be-used.

On the other hand, when the information processing system of the present invention is further furnished with an external memory and has at least one sort of output engine made detachable, it can be actually implemented in the form of a product such as a word processor or personal computer of the type having a separate printer, or as a print controlling system. In such a case, the transfer destination of the transfer means becomes the external memory, and the CPU transfers the bit map data stored in the external memory, to the output engine to-be-used.

Therefore, in the case where the information processing system of the present invention is furnished with the external memory, the transfer means for transferring the stored bit map data of the external memory to the output engine to-be-used is provided in the CPU. Further, the address update function of performing any of two or more sorts of address update schemes in transferring the bit map data stored in the external memory, and the address update selection function of selecting any of the two or more sorts of address update schemes on the basis of information externally given can be provided in the transfer means of the CPU, not in the transfer means of the character/pattern generator.

Incidentally, the CPU may well be furnished with acceptance means for accepting a designation of the output engine to-be-used.

In operation, the two or more sorts of coordinate transformations include, for example, coordinate transformations for an LP and coordinate transformations for a TTP.

The coordinate transformation selection function selects the coordinate transformations for the LP in the case of employing the LP as the output engine, whereas it selects the coordinate transformations for the TTP in the case of employing the TTP as the output engine. Therefore, the coordinate transformation function can be applied to one or more sorts of output engines.

Incidentally, even when the character/pattern generator performs only one sort of coordinate transformation, two or more sorts of coordinate transformations can be consequently performed in such a way that the CPU gives the character/pattern generator the coordinate transformation parameters (the elements of the $3 \times 3$ coordinate transformation matrix) which correspond to the address allocation of the output engine to-be-used.

In addition, the regional division means divides the region of the vector data in either required direction of the X and Y directions in the data transfer unit of the built-in memory (for example, in word unit) in accordance with the address allocation of the output engine. Thus, a blank part which contains no data and which appears within a word can be efficiently deleted in accordance with the address allocation of the output engine.

Besides, the two sorts of address update schemes include, for example, an address update scheme for the LP as shown in FIG. 5, in which the address allocation is the same as that of the built-in memory, that is, in which addresses are incremented in the X direction, and an address update scheme for the LP as shown in FIG. 6, in which the address allocation is different from that of the built-in memory, that is, in which addresses are incremented in the Y direction.

In a case where the LP assuming the address allocation as shown in FIG. 5 is employed as the output engine, the address update selection function selects the former address update scheme, and in a case where the LP assuming the address allocation as shown in FIG. 6 is employed as the output engine, the function selects the latter address update scheme. Therefore, the address update function can be applied to one or more sorts of output engines.

As described above, according to the present invention, the coordinate transformations can be performed in accordance with the address allocation of the output engine. This brings forth the effect that the character/-pattern generator and the information processing system are applicable to the output engines of various address allocations.

Moreover, in dividing the region of the vector data, the region can be divided into data transfer unit in only either direction of the X and Y directions in accordance with the address allocation of the output engine. This brings forth the effect that the regional division corresponding to the address allocation of the output engine is realized without forming the blank part within the data to-be-transferred.

Furthermore, in transferring the generated bit map data, the addresses can be updated in accordance with the address allocation of the output engine. This brings forth the effect that the character/pattern generator and the information processing system are applicable to output engines of different address allocations.

BRIEF DESCRIPTION OF THE DRAWINGS

FIG. 7 is an explanatory diagram showing a coordinate transformation method for the LP in this embodiment;

FIG. 17 is a flow chart showing an example of the algorithm of the data transfer operation of the CPU.

PREFERRED EMBODIMENTS OF THE INVENTION

Now, an embodiment of the present invention will be described in conjunction with the drawings.

In this embodiment, a character/pattern generator will be exemplified as being an apparatus which can generate both character data and pattern data in a dot form. The present invention, however, shall cover also an apparatus generating only character data and one generating only pattern data.

Figure 1:
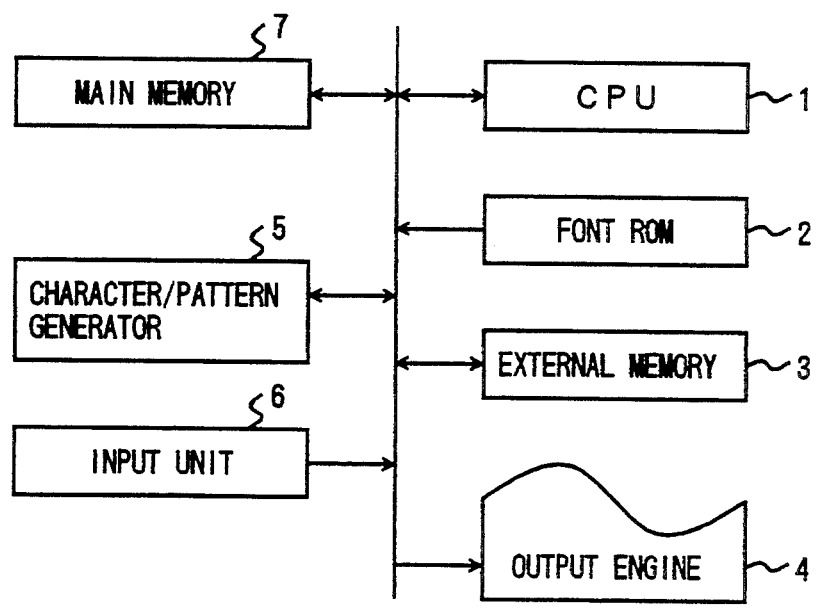
FIG. 1 is an architectural diagram of an information processing system to which a character/pattern generator in an embodiment of the present invention is applied.

FIG. 1 is an architectural diagram of an information processing system to which the character/pattern generator according to the present invention is applied.

Referring to FIG. 1, the information processing system includes a CPU 1 which controls the whole system, a font ROM 2 which stores vector data therein, an external memory 3 which stores bit map data therein, an output engine 4 which prints the bit map data, and the character/pattern generator 5 which executes a character/pattern generation process. In addition, it includes an input unit 6 with which data, instructions etc. are input, and a main memory 7 in which the operation program, data etc. of the CPU 1 are stored.

The CPU 1 transfers the vector data stored in the font ROM 2, to the character/pattern generator 5. The character/pattern generator 5 generates the bit map data from the vector data, and transfers the generated data to the external memory 3. Subsequently, the CPU 1 transfers the bit map data in the external memory 3, to the output engine 4 so as to print out the data.

Figure 2:
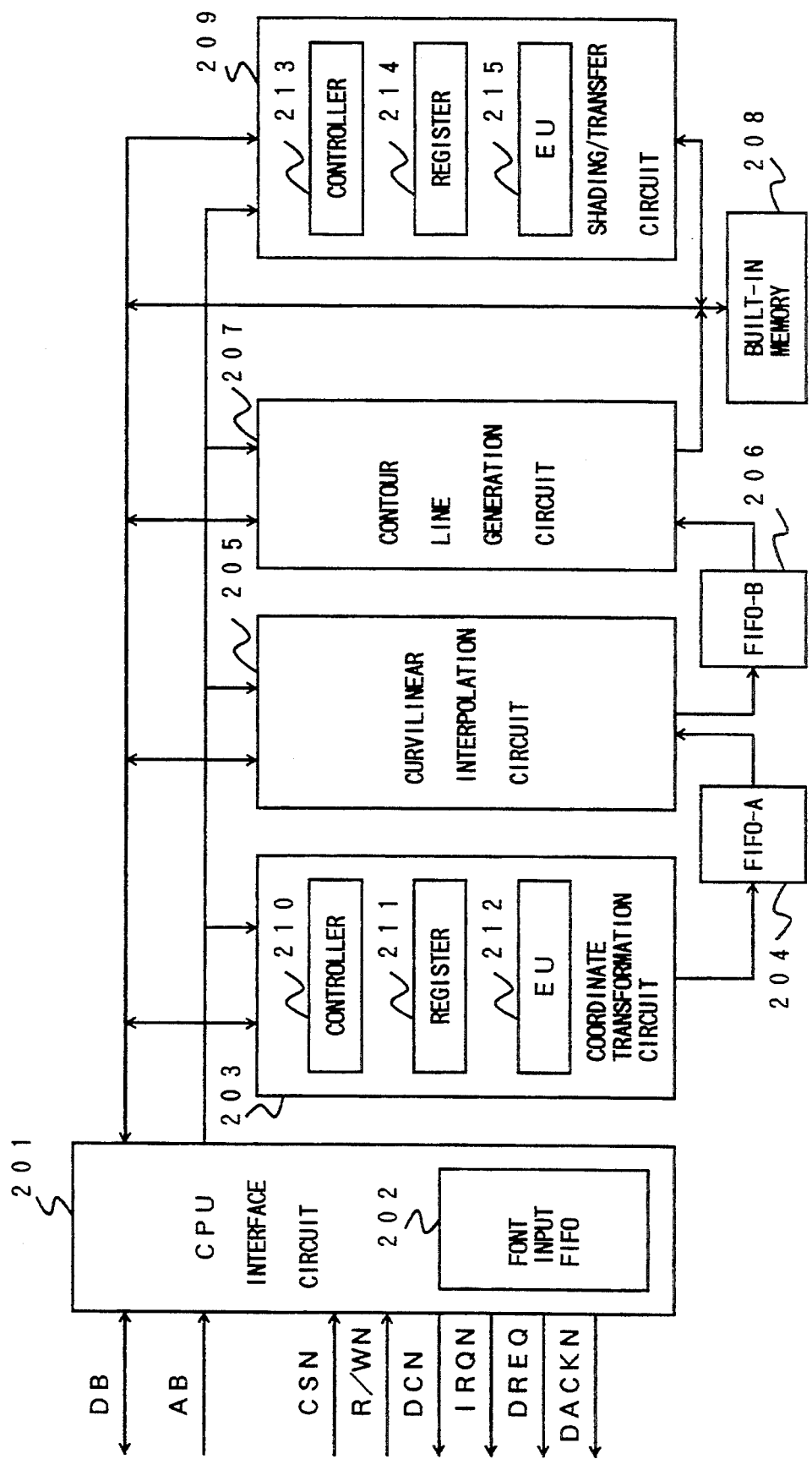
FIG. 2 is a block diagram of the character/pattern generator in the embodiment.

FIG. 2 is a block diagram of the character/pattern generator 5 in this embodiment.

Referring to FIG. 2, numeral 201 indicates a CPU interface circuit which controls the interface of the character/pattern generator 5 with the CPU 1. The CPU interface circuit 201 exchanges the vector data and bit map data through a data bus DB, and an address through an address bus AB. Besides, it exchanges such signals as a chip select signal (CSN), register read/write signal (R/WN), data complete signal (DCN), interrupt request signal (IRQN), data request signal (DREQN) and data request acknowledge signal (DACKN), to thereby controlling the start/stop of various circuits.

In addition, a font input FIFO (First-In First-Out buffer) 202 stores therein the vector data transferred from the CPU 1. The character/pattern generator 5 also includes a coordinate transformation circuit 203 by which the vector data stored in the font input FIFO 202 is subjected to a coordinate transformation, a FIFO-A 204 in which the coordinate-transformed data is stored, a curvilinear interpolation circuit 205 by which the data stored in the FIFO-A 204 is subjected to a curvilinear interpolation, a FIFO-B 206 in which the data subjected to the curvilinear interpolation is stored, a contour line generation circuit 207 which generates a straight line between the two points of the data stored in the FIFO-B 206, so as to generate the contour line of a character/pattern, a built-in memory 208 which stores therein the contour line of the character/pattern and the bit map data with the interior of the contour line shaded, and a shading/transfer circuit 209 which shades the interior of the contour line stored in the built-in memory 208 and which transfers the bit map data with the interior of the contour line shaded, to the external memory 3.

The coordinate transformation circuit 203 is configured of a coordinate transformation controller 210 which controls this circuit 203, a coordinate transformation mode register 211 in which a value for designating a coordinate transformation method to be performed by this circuit 203 is set, and a coordinate transformation execution unit (hereinbelow, abbreviated to "coordinate transformation EU") 212 which executes the calculations of the coordinate transformation. Likewise, the shading/transfer circuit 209 is configured of a shading/transfer controller 213 which controls this circuit 209, a transfer mode register 214 in which a value for designating a data transfer method to be performed by this circuit 209 is set, and a shading/transfer execution unit (hereinbelow, abbreviated to "shading/transfer EU") 215 which executes the calculations of the shading and those of the data transfer.

Incidentally, the font input FIFO 202, the FIFO-A 204 and the FIFO-B 206 conform to the first-in first-out system.

In this embodiment, in order to apply the character/pattern generator 5 to either or both of a case where the output engine 4 is an LP and a case where it is a TTP, the coordinate transformation circuit 203 is endowed with two sorts of coordinate transformation methods. Namely, a coordinate transformation method for the LP and a coordinate transformation method for the TTP. However, this aspect of performance is not restrictive, and the coordinate transformation circuit 203 may well be furnished with three or more sorts of coordinate transformation methods.

Further, regarding the LP, there are a case of adopting an address allocation in which addresses are incremented in the X direction of X-Y coordinates, and a case of adopting an address allocation in which addresses are incremented in the Y direction. In order to apply the character/pattern generator 5 to these two types of case, accordingly, the shading/transfer circuit 209 is endowed with two sorts of address update schemes. Namely, an address update scheme for the data transfer mode in the case of the address allocation of incrementing the addresses in the X direction, and an address update scheme for the data transfer mode in the case of the address allocation of incrementing the addresses in the Y direction. However, this aspect of performance is not restrictive, and the shading/transfer circuit 209 may well be furnished with three or more sorts of address update schemes.

Next, there will be explained processing steps along which the character/pattern generator 5 of this embodiment generates the character/pattern data.

Incidentally, the CPU 1 checks the output engine 4 type, especially the address allocation scheme thereof, and stores it in the main memory 7 when the output engine 4 is to be started or has been connected anew by way of example.

The CPU 1 writes the vector data stored in the font ROM 2, into the font input FIFO 202. Also, the CPU 1 sets the values for designating the coordinate transformation method and the data transfer method corresponding to the address allocation scheme of the output engine 4, in the coordinate transformation mode register 211 and the transfer mode register 214, respectively. Herein, if the font input FIFO 202 is in its full state, the CPU 1 waits until this FIFO comes to have an empty area.

In accordance with the value of the coordinate transformation mode register 211, the coordinate transformation circuit 203 subjects the vector data stored in the font input ROM 202, to the coordinate transformation such as enlargement, reduction, italicization or inclination, or rotation, with a coordinate transformation matrix of $3 \times 3$ elements by means of the coordinate transformation controller 210 and the coordinate transformation EU 212. The data after the transformation is stored in the FIFO-A 204. Herein, if the FIFO-A 204 is in its full state, the coordinate transformation circuit 203 waits until this FIFO comes to have an empty area.

On condition that the data is kept stored in the FIFO-A 204, the curvilinear interpolation circuit 205 subjects the coordinate values of this data to curvilinear interpolation and stores the resulting data in the FIFO-B 206. Herein, if the FIFO-B 206 is in its full state, the curvilinear interpolation circuit 205 waits until this FIFO comes to have an empty area.

A Bezier curve, a spline curve, a circular arc, etc. are known as algorithms of the curvilinear interpolation which are done by the curvilinear interpolation circuit 205. In this regard, since the curvilinear interpolation circuit 205 may be replaced in accordance with the algorithm adopted, any of the algorithms can be easily coped with.

On condition that the data is kept stored in the FIFO-B 206, the contour line generation circuit 207 generates the straight line between the two points of this data and draws the contour line of the character/pattern in the built-in memory 208.

The shading/transfer circuit 209 shades the interior of the contour line drawn in the built-in memory 208, thereby generating the bit map data. After the shading has ended, the bit map data generated in the built-in memory 208 is transferred to the external memory 3 in accordance with the value of the transfer mode register 214 by the shading/transfer controller 213 and the shading/transfer EU 215.

Thus, the character/pattern data in the dot form is stored in the external memory 3. The CPU 1 transfers the stored data of the external memory 3 to the output engine 4 so as to print it out.

Although the transfer of the bit map data drawn in the built-in memory 208 is done through the CPU interface circuit 201 in this embodiment, a memory interface circuit for exclusive use may well be employed.

Figure 3:
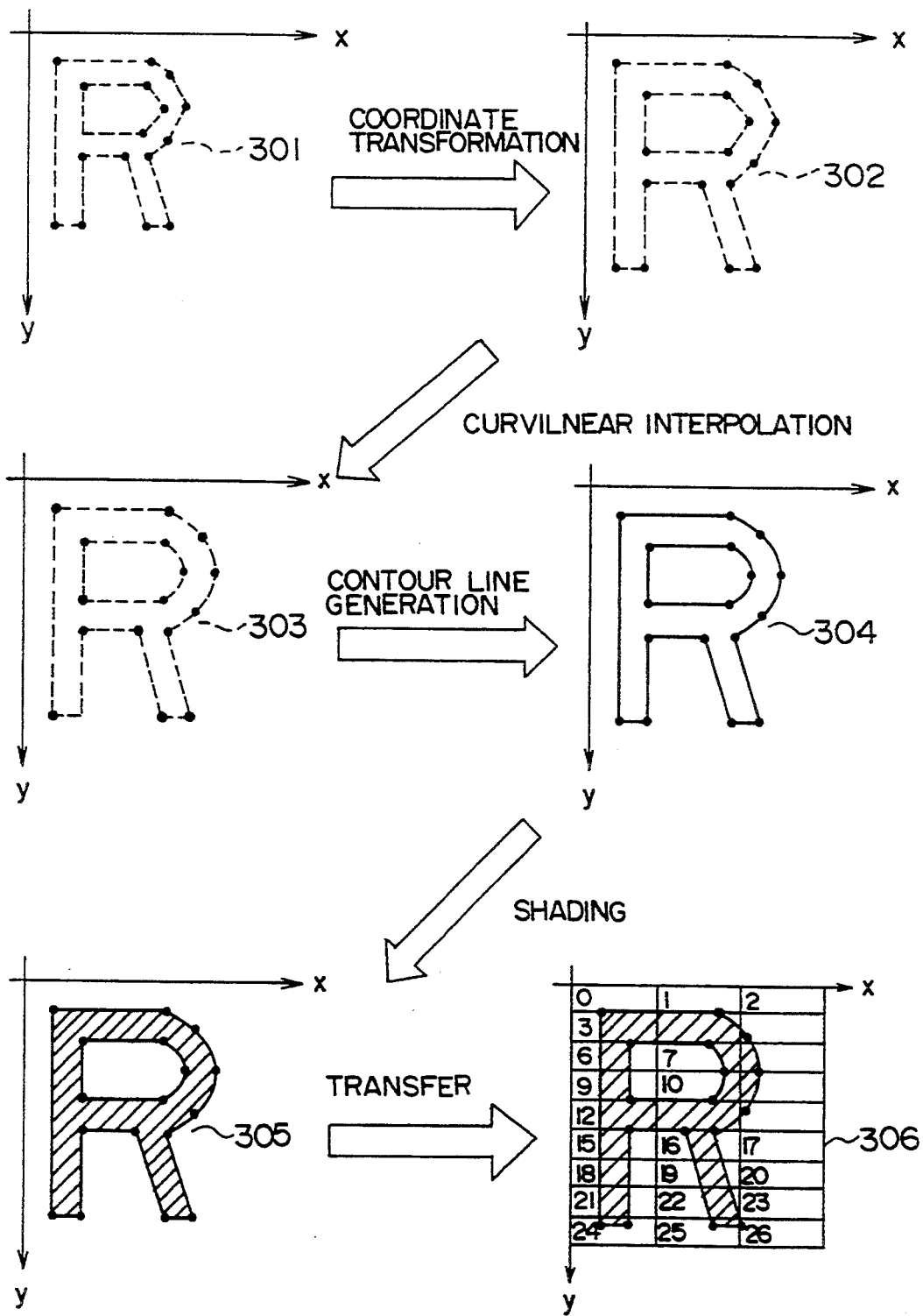
FIG. 3 is an explanatory diagram showing the changes of data in a character/pattern generation process.

FIG. 3 is a diagram showing in visualized fashion the changes of data in the character/pattern generation process in which the character/pattern generator 5 generates the bit map data from the vector data.

Referring to FIG. 3, numeral 301 indicates vector data stored in the font ROM 2, numeral 302 indicates data after the coordinate transformation of the data 301 by the coordinate transformation circuit 203, numeral 303 indicates data after the curvilinear interpolation of the data 302 by the curvilinear interpolation circuit 205, numeral 304 indicates data after the generation of the contour lines of the data 303 by the contour line generation circuit 207, numeral 305 indicates data after the shading of the interior of the data 304 by the shading/transfer circuit 209, and numeral 306 indicates data after the transfer of the data 305 to the external memory 3 by the shading/transfer circuit 209.

Next, the operation of the coordinate transformation circuit 203 will be explained.

Figure 4:
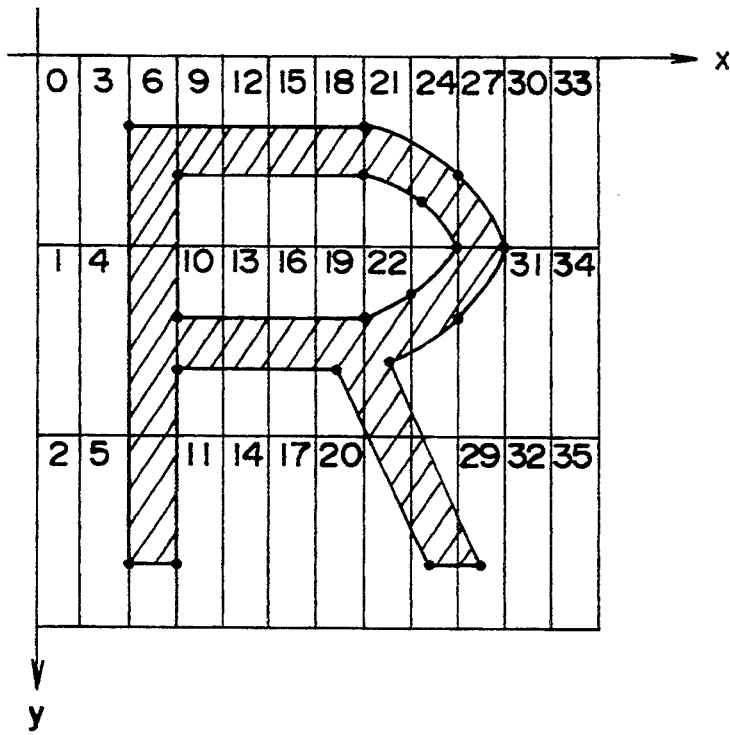
FIG. 4 is an explanatory diagram showing an example of the address allocation of an external memory in the case of employing a TTP as an output engine.

FIG. 4 is a diagram showing an example of the address allocation of the external memory 3 in the case where the TTP is employed as the output engine 4. On the other hand, FIG. 5 is a diagram showing an example of the address allocation of the external memory 3 in the case where the LP is employed as the output engine 4.

Figure 5:
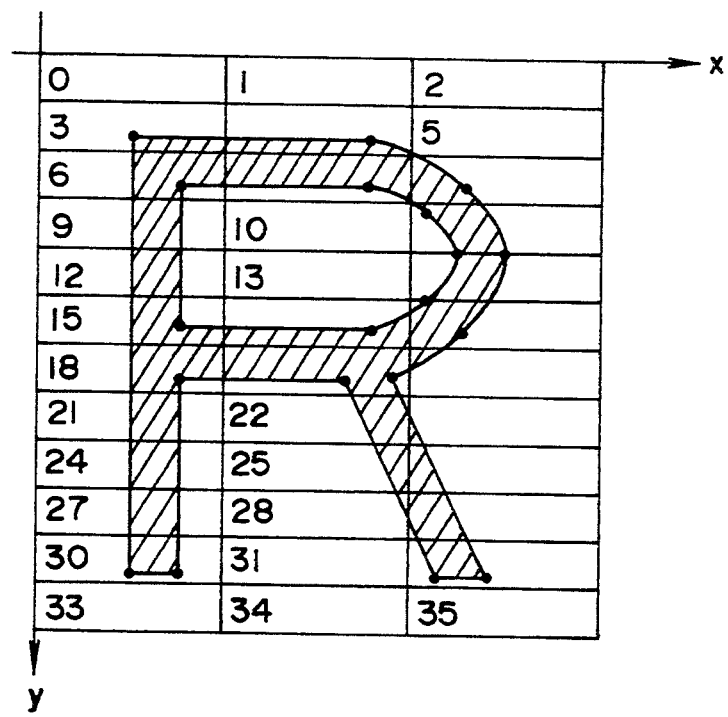
FIG. 5 is an explanatory diagram showing an example of the address allocation of an external memory in the case of employing an LP as an output engine.

Referring to FIGS. 4 and 5, the address allocations of the external memory 3 for the TTP and the external memory 3 for the LP are as illustrated and are the same as the address allocations of the TTP and the LP, respectively. In addition, the address allocation of the built-in memory 208 included in the character/pattern generator 5 is the same as that of the external memory 3 shown in FIG. 5.

In this embodiment, the coordinate transformation circuit 203 can perform the two sorts of coordinate transformation methods which consist of the coordinate transformation method for the LP and the coordinate transformation method for the TTP. Thus, the character/pattern generator 5 is able to be applied to both the LP and the TTP.

First, the coordinate transformation method for the LP will be explained with reference to FIGS. 5 and 7.

The address allocation of the LP, in other words, the address allocation of the external memory 3 is as illustrated in FIG. 5, while the address allocation of the built-in memory 208 is the same as that of the external memory 3.

As shown in FIG. 7, therefore, the coordinate values (X, Y) of vector data 701 in a right-handed coordinate system are coordinate-transformed by the use of a 3×3 coordinate transformation matrix 702, thereby obtaining data 703 represented by $X'=aX+bY+tx$ and $Y'=cX+dY+ty$. Here, symbols X' and Y' denote coordinate values after the coordinate transformation corresponding to the coordinate values X and Y, respectively. Besides, letters or symbols a, b, c, d, tx and ty denote the elements of the 3×3 coordinate transformation matrix 702. That is, the element a is that of the first row and first column of the matrix 702, the element b is that of the first row and second column, the element c is that of the second row and first column, the element d is that of the second row and second column, the element tx is that of the first row and third column, and the element ty is that of the second row and third column. The data 703 is further subjected to the curvilinear interpolation, contour line generation and shading processes, whereby bit map data 704 for the LP can be finally generated in the built-in memory 208. Accordingly, when the bit map data 704 generated in the built-in memory 208 is transferred to the external memory 3 in order of addresses, it can be printed by the LP.

Next, the coordinate transformation method for the TTP will be explained with reference to FIGS. 4, 8 and 9.

The address allocation of the TTP, in other words, the address allocation of the external memory 3 is as illustrated in FIG. 4, while the address allocation of the built-in memory 208 is different from that of the external memory 3.

The address allocation of the TTP, in other words, the address allocation of the external memory 3 is as illustrated in FIG. 4, while the address allocation of the built-in memory 208 is different from that of the external memory 3.

Figure 8:
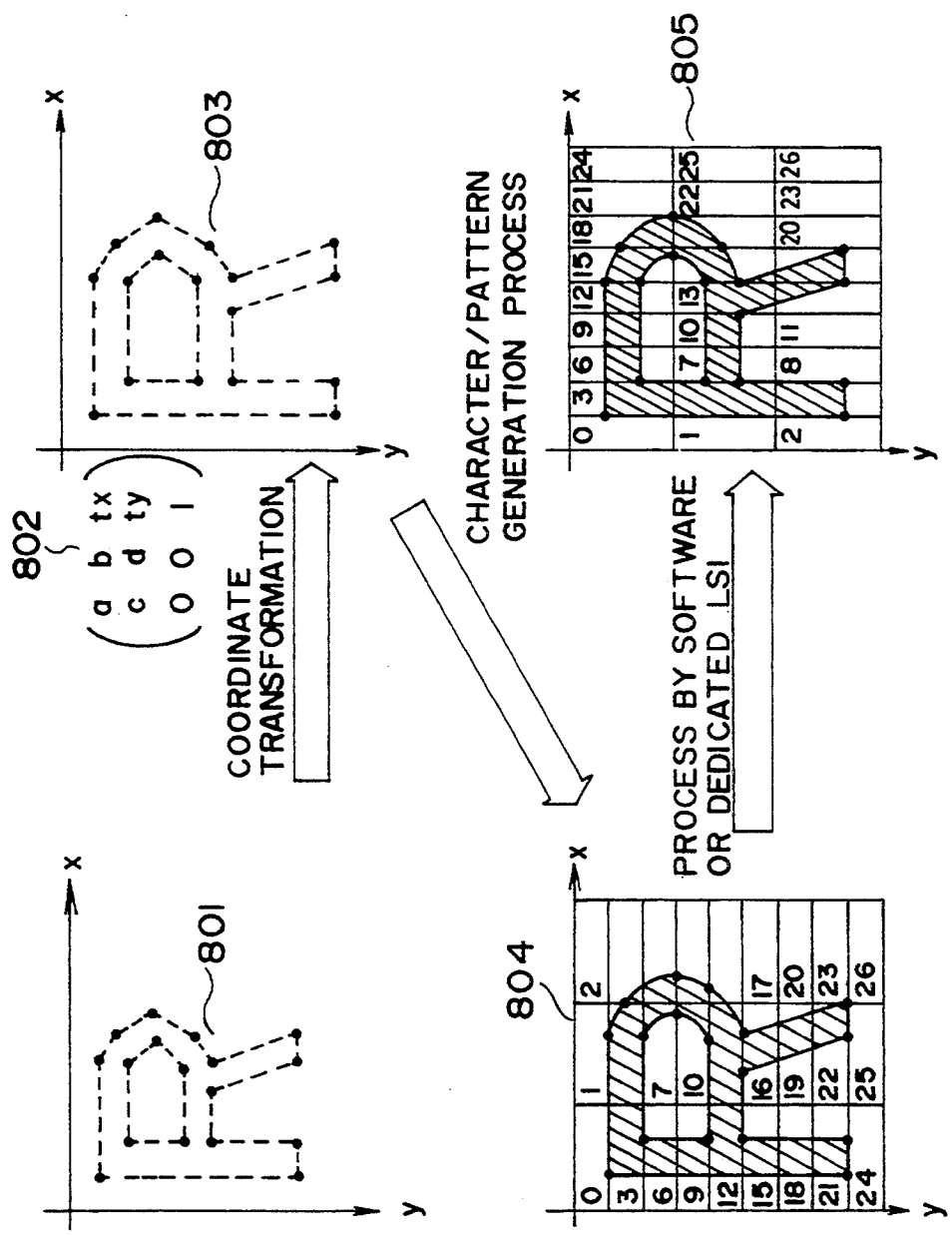
FIG. 8 is an explanatory diagram showing a data generation method for the TTP.

In general, in order to generate bit map data for a TTP by means of a coordinate transformation circuit, as shown in FIG. 8, vector data 801 in a right-handed coordinate system is subjected to virtually the same coordinate transformation as the coordinate transformation required for generating the bit map data for the LP, by the use of a 3×3 coordinate transformation matrix 802. Subsequently, data 803 after the coordinate transformation is subjected to the curvilinear interpolation, contour line generation and shading so as to once generate bit map data 804 which assumes the address allocation for the LP. Thereafter, bit map data 805 which conforms to the address allocation for the TTP is generated by a software process or a dedicated LSI. In this manner, in order to generate the bit map data for the TTP, the bit map data for the LP is first generated, whereupon the bit map data for the TTP is generated by the software process or the dedicated LSI. Accordingly, the processing period of time is very long.

Figure 9:
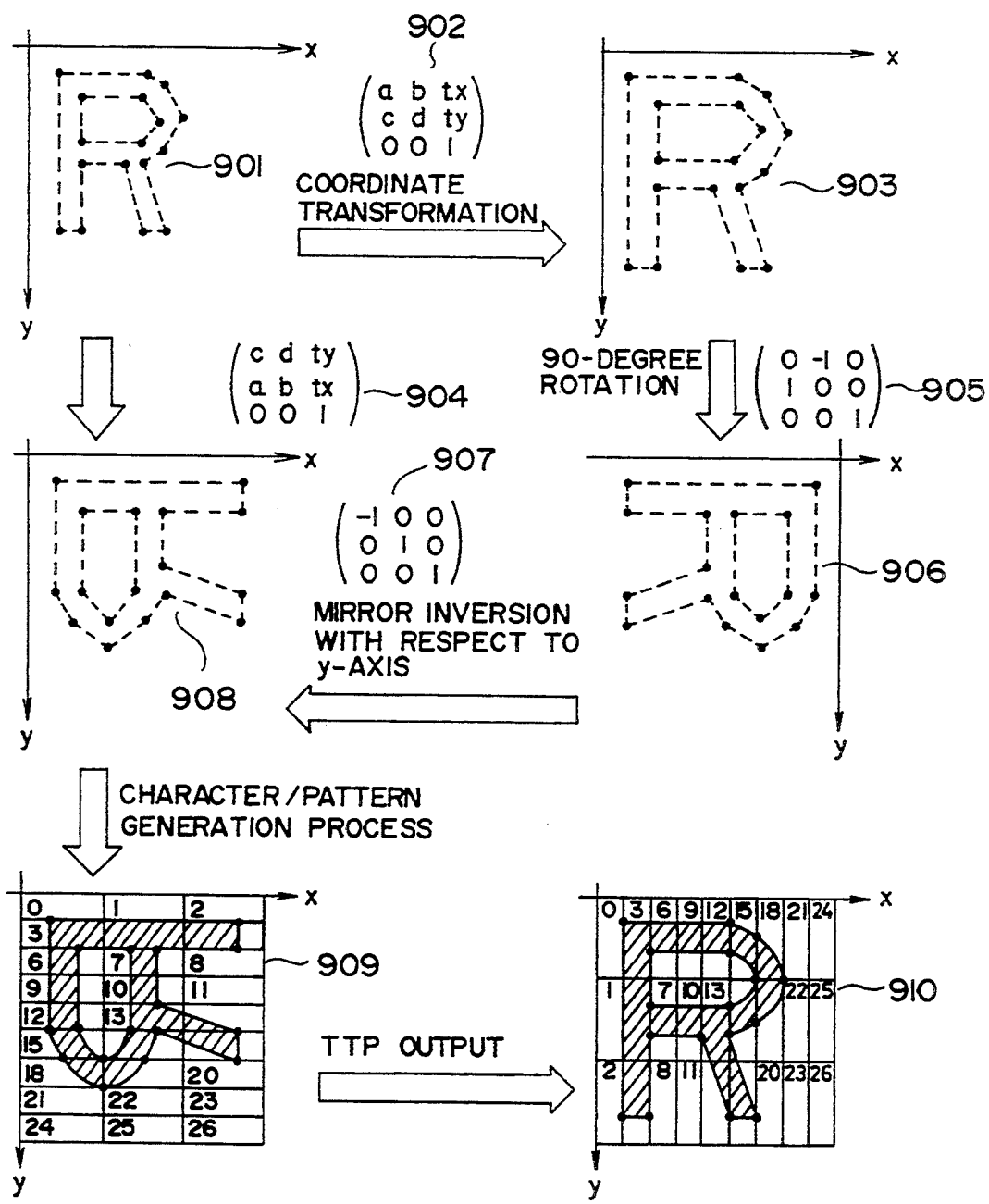
FIG. 9 is an explanatory diagram showing a data generation method for the TTP in this embodiment.

In this embodiment, therefore, as shown in FIG. 9, vector data 901 in the right-handed coordinate system is subjected to virtually the same coordinate transformation as the coordinate transformation required for generating the bit map data for the LP, by the use of a 3×3 coordinate transformation matrix 902. Subsequently, data 903 after the coordinate transformation is subjected to a coordinate transformation by the use of a 3×3 coordinate transformation matrix 905, whereby the data 903 is rotated 90 degrees to obtain data 906. Thereafter, the data 906 is subjected to a coordinate transformation by the use of a 3×3 coordinate transformation matrix 907, whereby the data 906 is mirror-inverted with respect to the Y axis of the coordinate system to obtain data 908. The data 908 is further subjected to curvilinear interpolation, contour line generation and shading processes. In this way, bit map data 909 for the TTP can eventually be generated in the built-in memory 208 so as to conform to the address allocation of the TTP without altering the address allocation of the built-in memory 208. Accordingly, when the bit map data 909 generated in the built-in memory 208 is transferred to the external memory 3 in order of addresses, data 910 is obtained in the external memory 3. The data 910 can be printed out by the TTP as it is.

This method, however, requires the three coordinate transformations of the same coordinate transformation process as the process for the LP, the 90-degree rotation process and the Y-axial mirror inversion process. Therefore, unless the CPU 1 calculates and sets the coordinate transformation parameters of the three coordinate transformations, the bit map data for the TTP is not generated.

In this regard, according to this embodiment, the data 908 can be obtained at a stroke in such a way that the CPU 1 calculates $X'=cX+dY+ty$ and $Y'=aX+bY+tx$ by the use of a 3×3 coordinate transformation matrix 904, instead of $X'=aX+bY+tx$ and $Y'=cX+dY+ty$ usually calculated for the coordinate transformation.

Next, the practicable circuit arrangement and operation of the coordinate transformation circuit 203 will be explained with reference to FIG. 10.

Figure 10:
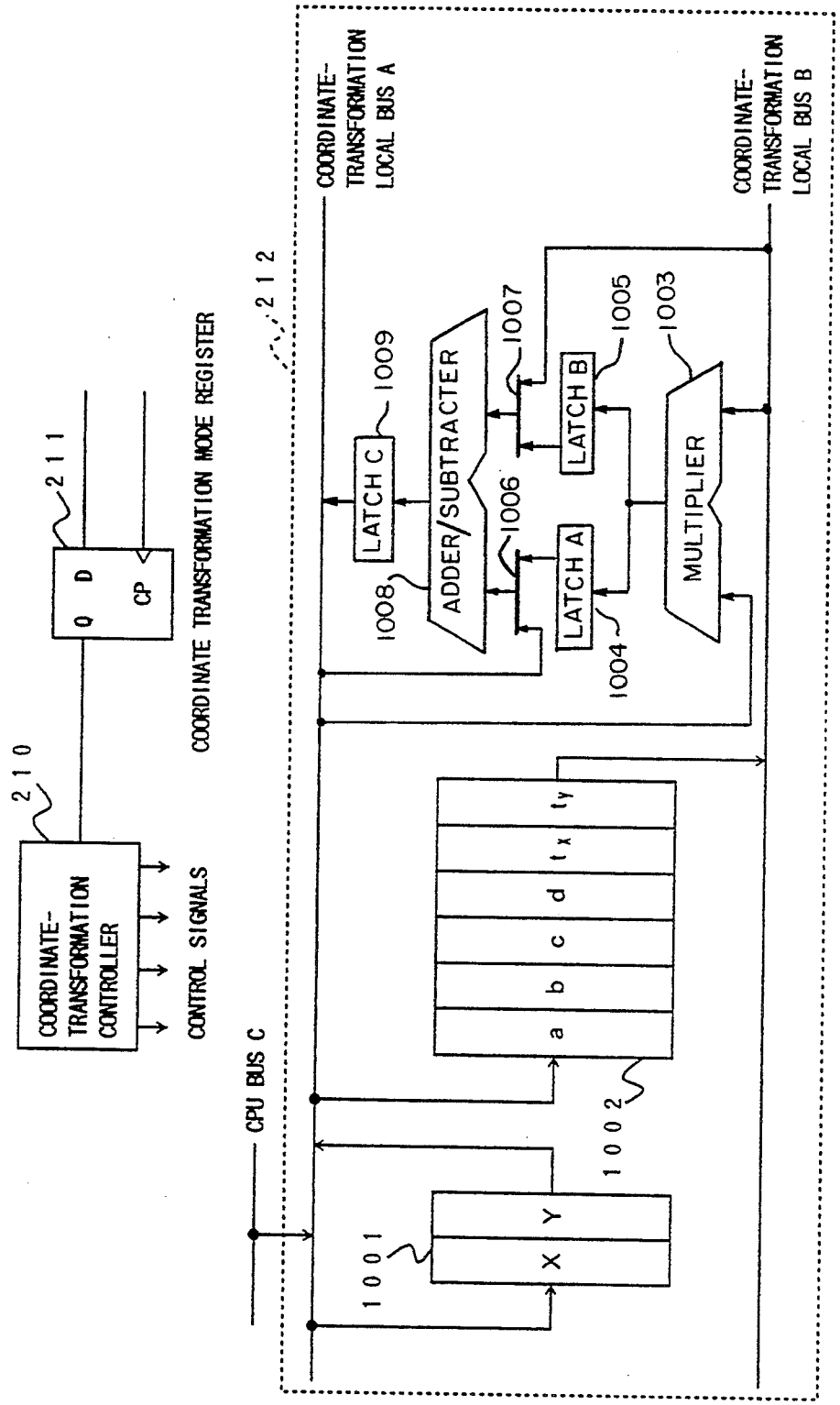
FIG. 10 is an arrangement diagram of a coordinate transformation circuit in this embodiment.

Referring to FIG. 10, numeral 210 indicates a coordinate transformation controller which controls the whole coordinate transformation circuit 203, and which can be constructed of a PLA (Programmable Logic Array), microprograms, the circuit of a state machine, or the like. The coordinate transformation controller 210 produces various control signals, and controls various calculations required for coordinate transformations.

Numeral 211 indicates a coordinate transformation mode register in which a value for designating a coordinate transformation method to be performed by the coordinate transformation circuit 203 is set, and which is constructed of a flip-flop.

Shown at numeral 212 is a coordinate transformation EU which executes the calculations of the coordinate transformation. The EU 212 includes register files 1001, 1002, a multiplier 1003, a latch-A 1004, a latch-B 1005, a latch-C 1009, selectors 1006, 1007, and an adder/subtracter 1008.

The CPU 1 sets "0" in the coordinate transformation mode register 211 if the output engine 4 is the LP, whereas it sets "1" in the same 211 if the output engine 4 is the TTP. Also, the CPU 1 sets coordinate values X and Y in the register file 1001 and sets the elements a, b, c, d, tx and ty of a 3×3 coordinate transformation matrix through a coordinate-transformation local bus A from a CPU bus C.

The coordinate transformation controller 210 sequentially generates the control signals of the calculations necessary for the coordinate transformation, in accordance with the value of the coordinate transformation mode register 211.

First, on condition that the value of the coordinate transformation mode register 211 is "0", the value X set in the register file 1001 is sent to the multiplier 1003 through the coordinate-transformation local bus A, and the element a set in the register file 1002 is sent to the multiplier 1003 through a coordinate-transformation local bus B. The multiplier 1003 calculates a×X, and stores the calculated result in the latch-A 1004.

Subsequently, the value Y set in the register file 1001 is sent to the multiplier 1003 through the coordinate-transformation local bus A, and the element b set in the register file 1002 is sent to the multiplier 1003 through the coordinate-transformation local bus B. The multiplier 1003 calculates b×Y, and stores the calculated result in the latch-B 1005.

At the next step, the data stored in the latch-A 1004 is sent to the adder/subtracter 1008 through the selector 1006, and the data stored in the latch-B 1005 is sent to the adder/subtracter 1008 through the selector 1007. The adder/subtracter 1008 calculates aX+bY, and stores the calculated result in the latch-C 1009.

Next, the data stored in the latch-C 1009 is sent to the adder/subtracter 1008 through the coordinate-transformation local bus A as well as the selector 1006, and the element tx set in the register file 1002 is sent to the adder/subtracter 1008 through the coordinate-transformation local bus B as well as the selector 1007. The adder/subtracter 1008 calculates aX+bY+tx, and stores the calculated result in the latch-C 1009.

At this point of time, the data stored in the latch-C 1009 is X' (=aX+bY+tx). Therefore, the coordinate transformation controller 210 stores the data X' in the FIFO-A 204 (refer to FIG. 2) through the coordinate-transformation local bus A. Incidentally, subject to the full state of the FIFO-A 204, the controller 210 waits with its state left intact, until the FIFO-A 204 comes to have an empty area.

Further, when data stored in the latch-C 1009 has become Y' (=cX+dY+ty) likewise to the foregoing, the coordinate transformation controller 210 stores the data Y' in the FIFO-A 204 through the coordinate-transformation local bus A. Incidentally, subject to the full state of the FIFO-A 204, the controller 210 waits with its state left intact, until the FIFO-A 204 comes to have an empty area.

Meanwhile, on condition that the value of the coordinate transformation mode register 211 is "1", the value X set in the register file 1001 is sent to the multiplier 1003 through the coordinate-transformation local bus A, and the element c set in the register file 1002 is sent to the multiplier 1003 through the coordinate-transformation local bus B. The multiplier 1003 calculates c×X, and stores the calculated result in the latch-A 1004.

Subsequently, the value Y set in the register file 1001 is sent to the multiplier 1003 through the coordinate-transformation local bus A, and the element d set in the register file 1002 is sent to the multiplier 1003 through the coordinate-transformation local bus B. The multiplier 1003 calculates d×Y, and stores the calculated result in the latch-B 1005.

At the next step, the data stored in the latch-A 1004 is sent to the adder/subtracter 1008 through the selector 1006, and the data stored in the latch-B 1005 is sent to the adder/subtracter 1008 through the selector 1007. The adder/subtracter 1008 calculates cX+dY, and stores the calculated result in the latch-C 1009.

Next, the data stored in the latch-C 1009 is sent to the adder/subtracter 1008 through the coordinate-transformation local bus A as well as the selector 1006, and the element ty set in the register file 1002 is sent to the adder/subtracter 1008 through the coordinate-transformation local bus B as well as the selector 1007. The adder/subtracter 1008 calculates cX+dY+ty, and stores the calculated result in the latch-C 1009.

At this point of time, the data stored in the latch-C 1009 is X' (=cX+dY+ty). Therefore, the coordinate transformation controller 210 stores the data X' in the FIFO-A 204 through the coordinate-transformation local bus A. Incidentally, subject to the full state of the FIFO-A 204, the controller 210 waits with its state left intact, until the FIFO-A 204 comes to have an empty area.

Further, when data stored in the latch-C 1009 has become Y' (=aX+bY+tx) likewise to the foregoing, the coordinate transformation controller 210 stores the data Y' in the FIFO-A 204 through the coordinate-transformation local bus A. Incidentally, subject to the full state of the FIFO-A 204, the controller 210 waits with its state left intact, until the FIFO-A 204 comes to have an empty area.

That is, the coordinate transformation controller 210 causes the coordinate transformation EU 212 to execute the calculations of either of the following equations (1) and (2) by means of the multiplier 1003, the adder/subtracter 1008, the first, second and third latch circuits 1004, 1005 and 1009, and the selectors 1006 and 1007 in accordance with the set value of the coordinate transformation mode register 211:

$$\begin{pmatrix} X' \\ Y' \\ 1 \end{pmatrix} = \begin{pmatrix} a & b & tx \\ c & d & ty \\ 0 & 0 & 1 \end{pmatrix} \begin{pmatrix} X \\ Y \\ 1 \end{pmatrix} \quad (1)$$

$$\begin{pmatrix} X' \\ Y' \\ 1 \end{pmatrix} = \begin{pmatrix} c & d & ty \\ a & b & tx \\ 0 & 0 & 1 \end{pmatrix} \begin{pmatrix} X \\ Y \\ 1 \end{pmatrix} \quad (2)$$

Incientally, the circuit arrangement of the coordinate transformation circuit 203 stated above is a mere example. Needless to say, the present invention is applicable even when the coordinate transformation circuit 203 has a different circuit arrangement.

Figure 11:
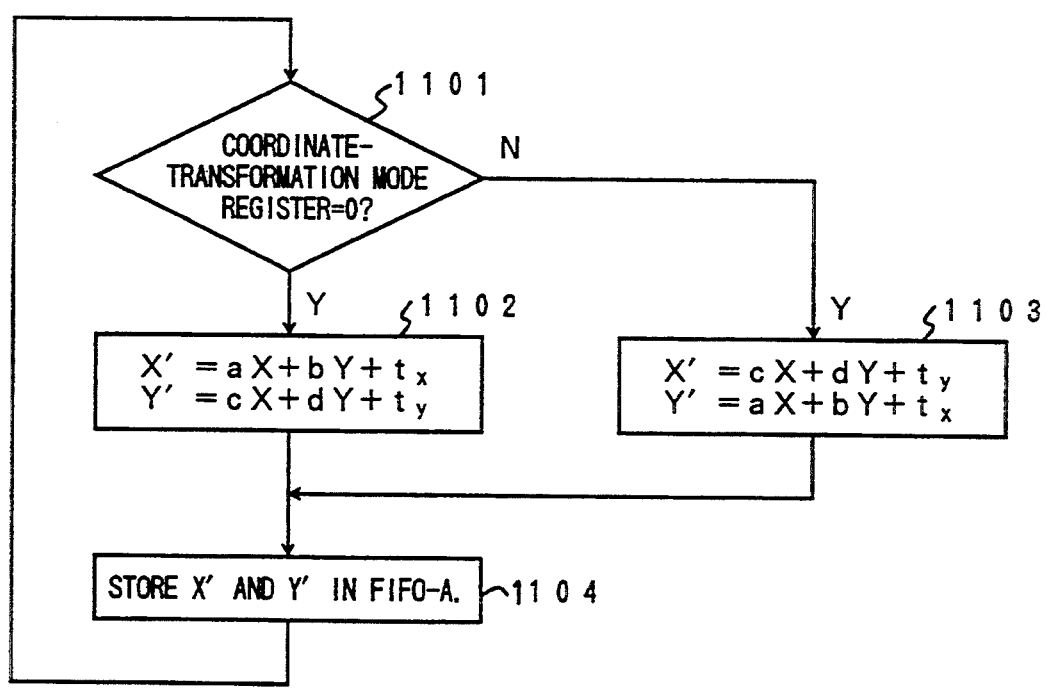
FIG. 11 is a flow chart showing the algorithm of the operation of the coordinate transformation circuit.

FIG. 11 is a flow chart in which the operating algorithm of the foregoing coordinate transformation circuit 203 is concisely illustrated.

When the output engine 4 is the LP, "0" which is the value for designating the coordinate transformation method for the LP is set in the coordinate transformation mode register 211 by the CPU 1, and when the output engine 4 is the TTP, "1" which is the value for designating the coordinate transformation method for the TTP is set in the same 211.

Accordingly, the coordinate transformation circuit 203 first decides the value set in the coordinate transformation mode register 211 (step 1101). If the value set in the coordinate transformation mode register 211 is "0", the coordinate transformation for the LP is to be performed. Therefore, the coordinate transformation is done in conformity with $X'=aX+bY+tx$ and $Y'=cX+dY+ty$ (step 1102), and the obtained values $X'$ and $Y'$ are stored in the FIFO-A 204 (step 1104). In contrast, unless the value set in the coordinate transformation mode register 211 is "0", the coordinate transformation for the TTP is to be performed. Therefore, the coordinate transformation is done in conformity with $X'=cX+dY+ty$ and $Y'=aX+bY+tx$ (step 1103), and the obtained values $X'$ and $Y'$ are stored in the FIFO-A 204 (step 1104). After the operation of the step 1104, the routine returns to the step 1101.

Both the coordinate transformation data for the LP and the coordinate transformation data for the TTP can be generated by executing the steps 1101~1104. Here, the quantities a, b, c, d, tx and ty are coordinate transformation parameters which are given by the CPU 1.

Here in the illustrated case, the coordinate transformation for the LP is performed if the value set in the coordinate transformation mode register 211 is "0", and the coordinate transformation for the TTP is performed unless it is "0". It is a matter of course, however, that the relationship may well be reversed.

Incidentally, according to this embodiment, the coordinate transformation circuit 203, per se, picks out the coordinate transformation parameters set by the CPU 1 (the elements of the 3×3 coordinate transformation matrix) so as to conform to the designated coordinate transformation method and then carries out the coordinate transformation. Accordingly, the CPU 1 needs only to set the parameters as in the prior art. Alternatively, however, an embodiment is also considered in which the CPU 1, per se, sets coordinate transformation parameters which correspond to the address allocation of the output engine 4. In this case, the coordinate transformation circuit 203 actually performs the calculations of only one sort in the same manner as in the prior art. Since, however, the CPU 1 sets the coordinate transformation parameters so as to conform to the coordinate transformation method corresponding to the address allocation of the output engine 4, the coordinate transformation circuit 203 performs two sorts of coordinate transformations consequently.

Now, such an embodiment will be described with reference to FIG. 12.

Figure 12:
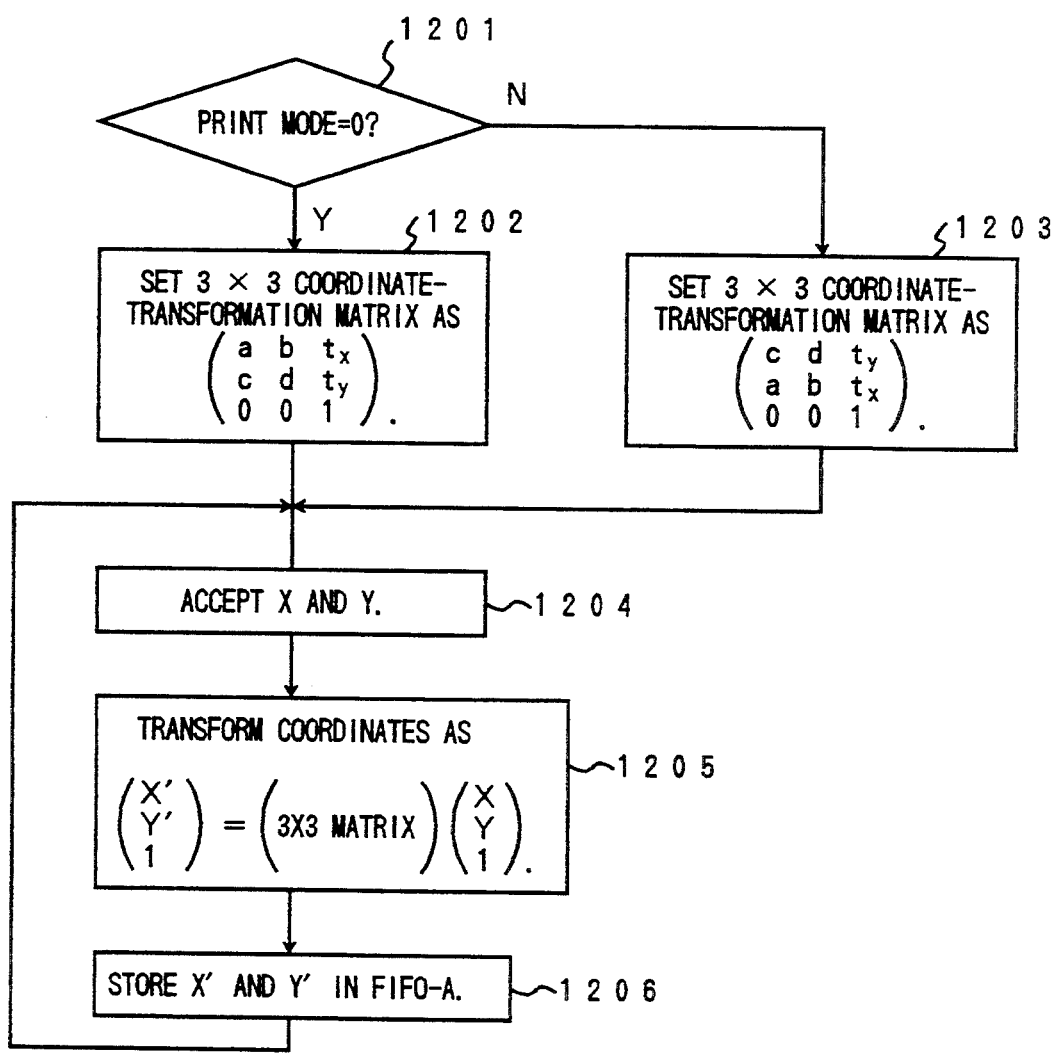
FIG. 12 is a flow chart showing the algorithm of the operation of a CPU for setting coordinate transformation parameters and the operation of the coordinate transformation circuit.

FIG. 12 is a flow chart showing the algorithm of the operation of the CPU 1 for setting the coordinate transformation parameters and the operation of the coordinate transformation circuit 203.

In this embodiment, a value indicative of a print mode is set in the internal register of the CPU 1 in accordance with the the output engine 4 type. As the print mode value, "0" is set when the output engine 4 is the LP, and "1" is set when it is the TTP.

Accordingly, if the print mode value is "0" (step 1201), the CPU 1 sets the elements of the 3×3 coordinate transformation matrix for the LP (step 1202). Specifically, the element of the first row and first column of the matrix is set as a, that of the first row and second column as b, that of the first row and third column as tx, that of the second row and first column as c, that of the second row and second column as d, that of the second row and third column as ty, that of the third row and first column as 0, that of the third row and second column as 0, and that of the third row and third column as 1.

To the contrary, if the print mode value is "1" (step 1201), the CPU 1 sets the elements of the 3×3 coordinate transformation matrix for the TTP (step 1203). Specifically, the element of the first row and first column of the matrix is set as c, that of the first row and second column as d, that of the first row and third column as ty, that of the second row and first column as a, that of the second row and second column as b, that of the second row and third column as tx, that of the third row and first column as 0, that of the third row and second column as 0, and that of the third row and third column as 1.

Subsequently, the coordinate transformation circuit 203 accepts the coordinate values X and Y (step 1204) and performs the coordinate transformation in accordance with the set elements of the 3×3 coordinate transformation matrix (step 1205). Lastly, the circuit 203 stores the calculated values $X'$ and $Y'$ in the FIFO-A 204 (step 1206).

Thus, even when the coordinate transformation circuit 203 can execute only one sort of coordinate transformation, it can offer the two sorts of coordinate transformation results, namely, the data after the coordinate transformations for the LP and for the TTP.

In the above, the elements of the 3×3 coordinate transformation matrix for the LP are set if the print mode value is "0", and the elements of the 3×3 coordinate transformation matrix for the TTP are set unless the print mode value is "0". It is a matter of course, however, that the relationship may well be reversed.

Here, regarding the designation of the print mode, there are a case where software for controlling the operation of the output engine 4 designates the print mode, a case where the user of the information processing system directly designates the print mode with the input unit such as a keyboard 6, and so forth. Alternatively, when the use of the system is restricted to one sort of output engine 4, only one print mode may well be fixedly designated.

Next, methods of dividing the region of vector data into a plurality of subregions in the case of dividingly generating a character/pattern will be detailed with reference to FIG. 13 and FIGS. 14(a) and 14(b).

In such a case where bit map data to be generated by the character/pattern generator 5 becomes larger in size than the storage capacity if the built-in memory 208, the CPU 1 functions to divide the region of the vector data into two or more subregions so as to generate bit map data for every subregional vector data.

Figure 13:
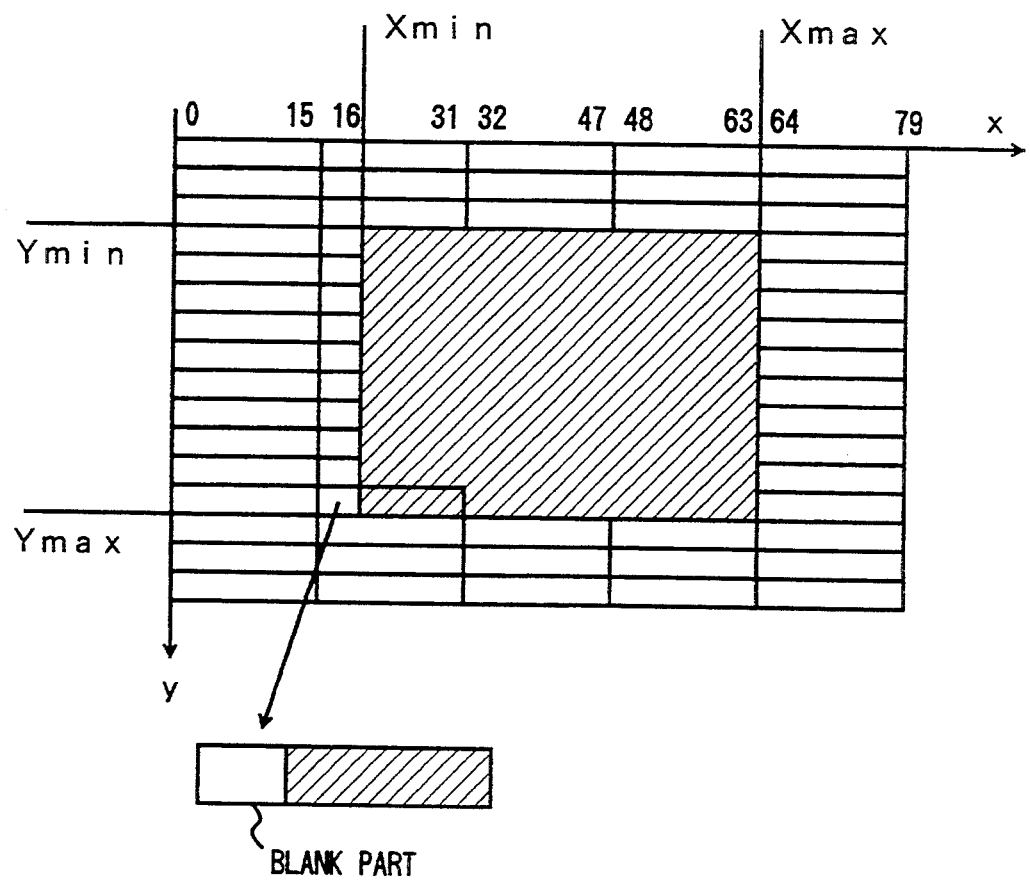
FIG. 13 is an explanatory diagram showing a regional division method.
Figure 14A:
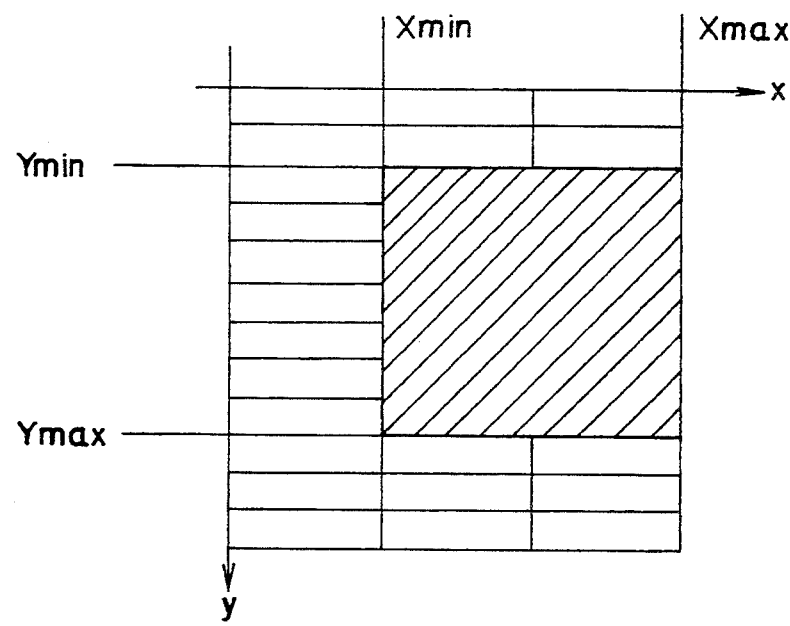
FIGS. 14(a) and 14(b) are explanatory diagrams each showing a regional division method in the present invention.
Figure 14B:
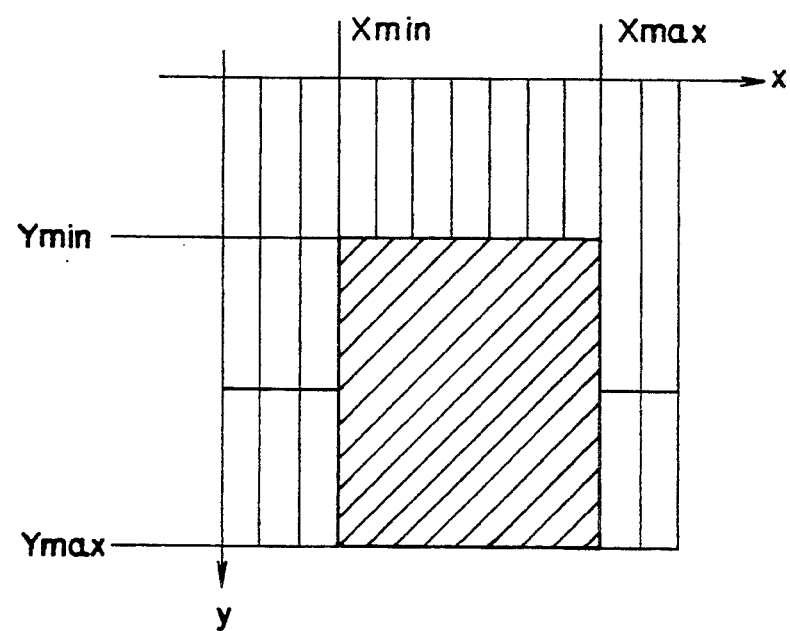

FIG. 13 is an explanatory diagram showing a method of dividing the region of vector data, while FIGS. 14(a) and 14(b) are explanatory diagrams each showing a method of dividing the region of vector data in this embodiment.

As to the regional division of the vector data, there is considered a method in which the region is divided into the data transfer unit of the built-in memory 208 (in word units) in only the X direction or a method in which the region is divided into any desired integral unit (in bit units) in both the X and Y directions. Here, as illustrated in FIG. 13 by way of example, when the region is divided in a unit based on any number other than the multiple of 16 (into any unit other than word units) in the X direction, a value $X_{min}$ fails to become the multiple of 16. In this case, since the unit of the data transfer from the built-in memory 208 to the external memory 3 is the word unit, a blank part in which no data is generated appears at the left of a word which contains the value $X_{min}$. In the illustration, $X_{min}$ denotes the minimum value of the region in the X direction, $X_{max}$ the maximum value of the region in the X direction, $Y_{min}$ the minimum value of the region in the Y direction, and $Y_{max}$ the maximum value of the region in the Y direction.

In this embodiment, therefore, the region of the vector data is divided so as to prevent the blank part from appearing.

The explanatory diagram of FIG. 14(a) illustrates the method of dividing the region for the LP.

In this case, the regional division of the vector data in the X direction is done in units of the multiple of 16 (in word units), and the regional division in the Y direction is done in integral units, so that almost no blank part appears within a word. Moreover, owing to the integral unit of the regional division in the Y direction, the method of dividing the region is comparatively versatile.

The explanatory diagram of FIG. 14(b) illustrates the method of dividing the region for the TTP.

In this case, the regional division in the X direction is done in integral units, and the regional division in the Y direction is done in units of the multiple of 16 (in word units), so that almost no blank part appears within a word. Moreover, owing to the integral unit of the regional division in the X direction, the method of dividing the region is comparatively versatile.

Figure 19:
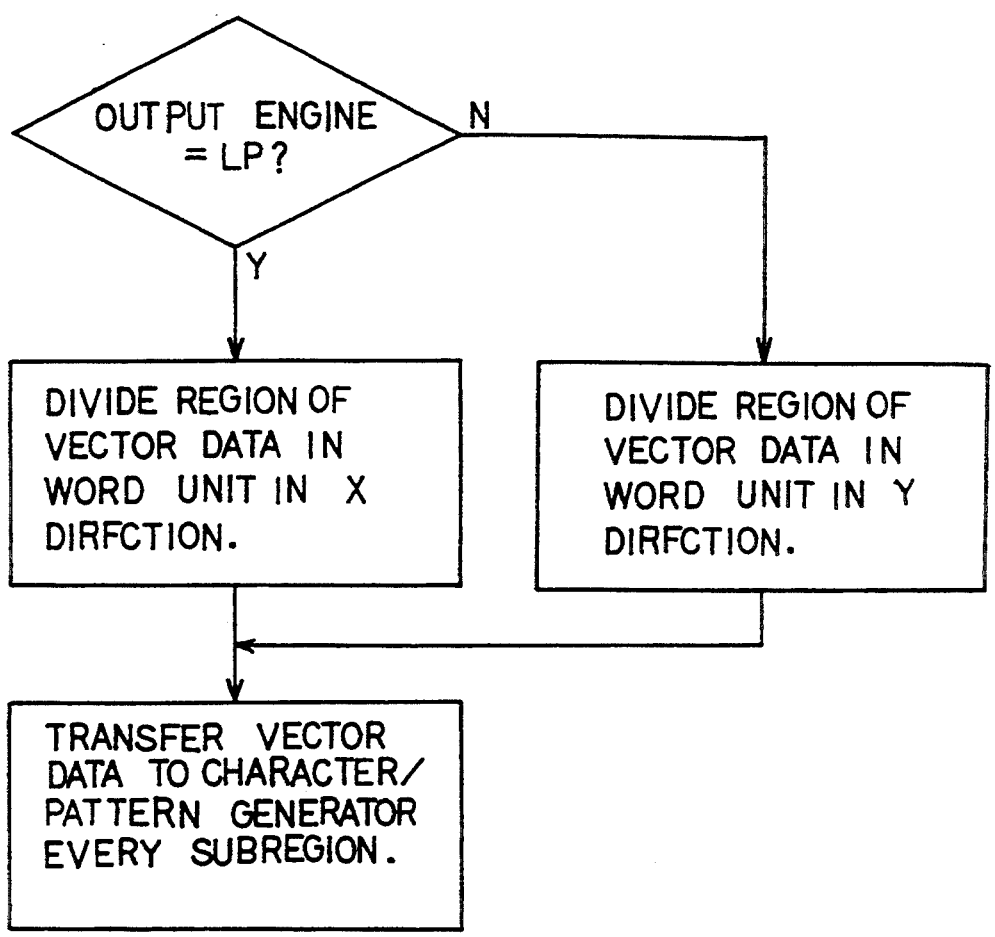
FIG. 19 is a flow chart showing the algorithm of the regional division operation of the CPU.

In this embodiment, for the purpose of the regional division, the CPU 1 includes means for performing the region dividing method shown in FIG. 14(a) and means for performing the region dividing method shown i FIG. 14(b). Also, the CPU 1 includes means for discriminating the output engine 4 type in printing the bit map data, so as to select the regional division mathod corresponding to the output engine 4 type. These means are constructed in such a way that the CPU 1 executes the processing steps of a flow chart illustrated in FIG. 19.

Here in the exemplified methods, the unit of the data transfer from the built-in memory 208 to the external memory 3 is the word unit. Needless to say, however, even when the data transfer is in byte units, the present invention is applicable by dividing the region into units based on the multiple of 8 (into byte units).

Next, the operation of the shading/transfer circuit 209 will be explained.

Figure 6:
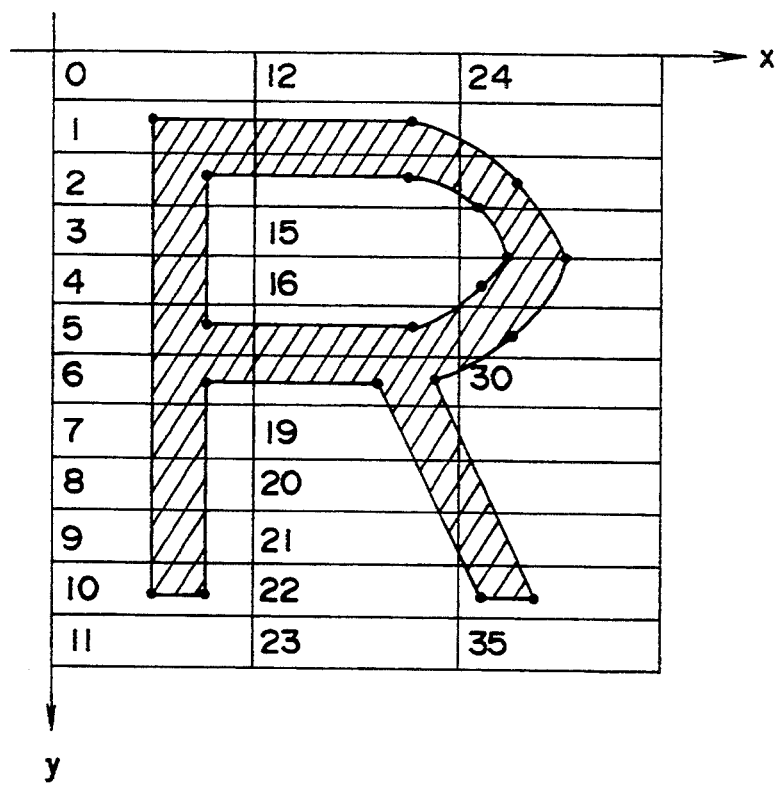
FIG. 6 is an explanatory diagram showing another example of the address allocation of an external memory in the case of employing the LP as the output engine.

The LP's have, not only the address allocation as shown in FIG. 5, but also the address allocation as shown in FIG. 6. In the address allocation of FIG. 5, addresses are incremented in the X direction, whereas in the address allocation of FIG. 6, addresses are incremented in the Y direction.

In a case where the output engine 4 employed is the LP which assumes the address allocation shown in FIG. 5, that is, the LP whose address allocation is the same as the address allocation of the built-in memory 208, the addresses may be successively incremented in the operation in which bit map data generated in the built-in memory 208 is transferred to the external memory 3. However, in a case where the output engine 4 employed is the LP which assumes the address allocation shown in FIG. 6, that is, the LP whose address allocation is different from the address allocation of the built-in memory 208, the mere incrementing of the addresses is not applicable in the operation in which the bit map data generated in the built-in memory 208 is transferred to the external memory 3.

Therefore, address update schemes in the data transfer operation must be changed-over depending upon the address allocations of the LP's.

Next, the practicable circuit arrangement and operation of the shading/transfer circuit 209 will be explained with reference to FIG. 15.

Figure 15:
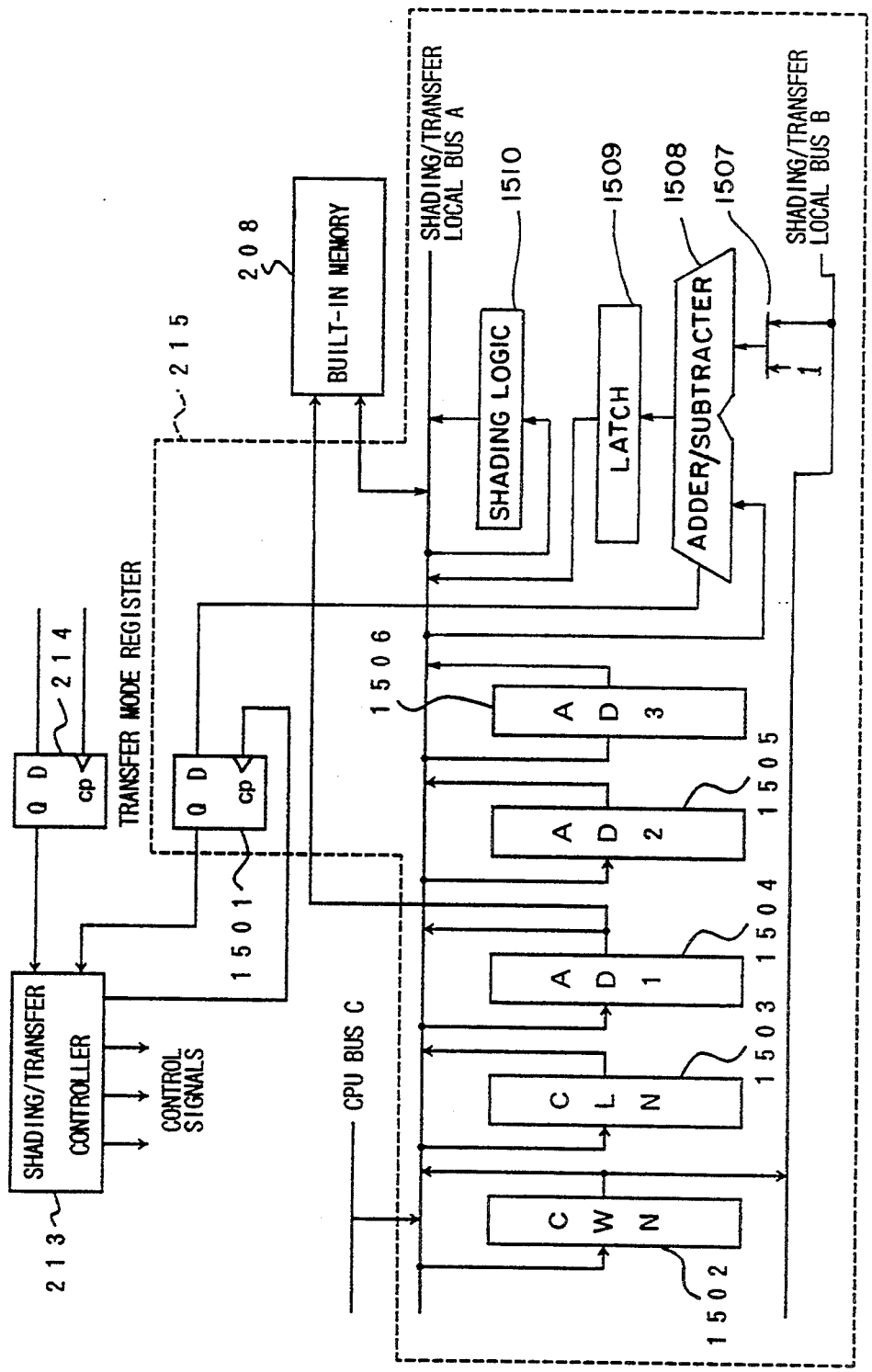
FIG. 15 is an arrangement diagram of a shading/transfer circuit in this embodiment.

Referring to FIG. 15, numeral 213 indicates a shading/transfer controller which controls the whole shading/transfer circuit 209, and which can be constructed of a PLA, microprograms, the circuit of a state machine, or the like. The shading/transfer controller 213 produces various control signals, and controls various calculations required for shading/transfer operations.

Numeral 214 indicates a transfer mode register in which a value for designating a transfer method to be performed by the shading/transfer circuit 209 is set, and which is constructed of a flip-flop.

Shown at numeral 215 is a shading/transfer EU which executes the calculations of the shading and those of the transfer. The EU 215 includes a register 1501, a register CWN 1502, a register CLN 1503, a register AD1 (1504), a register AD2 (1505), a register AD3 (1506), a selector 1507, an adder/subtracter 1508, a latch 1509, and shading logic 1510.

The register 1501 is a register which stores therein a value indicating whether or not the calculated result of the adder/subtracter 1508 is "0", and which is constructed of a flip-flop. In addition, the register AD1 (1504) is a register which supplies an address for accessing the built-in memory 208. Besides, the registers AD2 (1505) and AD3 (1506) are temporary registers.

First, there will be explained the operation of shading the interior of the bit map data generated in the built-in memory 208.

The CPU 1 sets "0" in the transfer mode register 214 if the external memory 3 assumes the address allocation of the LP in which the addresses are incremented in the X direction as shown in FIG. 5. On the other hand, it sets "1" if the external memory 3 assumes the address allocation in which the addresses are incremented in the Y direction as shown in FIG. 6. The CPU 1 also sets the lateral number of words (CWN) of a character/pattern in the register CWN 1502, sets the vertical number of lines (CLN) of the character/pattern in the registers CLN 1503 and AD3 (1506), and sets "0" in the registers AD1 (1504) and AD2 (1505) through a shading/transfer bus A from the CPU bus C.

The shading/transfer controller 213 sequentially generates the control signals of the calculations which are necessary for the shading of the interior of the contour line of the character/pattern generated in the built-in memory 208 by the contour line generation circuit 207 shown in FIG. 2. Specifically, the controller 213 fetches the data from the built-in memory 208 by using the value of the register AD1 (1504) (which is incremented) as a fetch address and transfers the data to the shading logic 1510 through the shading/transfer bus A. The shading logic 1510 shades the interior of the accepted data, and re-inputs the resulting data into the built-in memory 208. Since the circuit arrangement and operation of the shading logic 1510 are described in detail in the official gazette of Japanese Patent Application Laid-open No. 214368/1991, they shall be omitted from description here.

Figure 16:
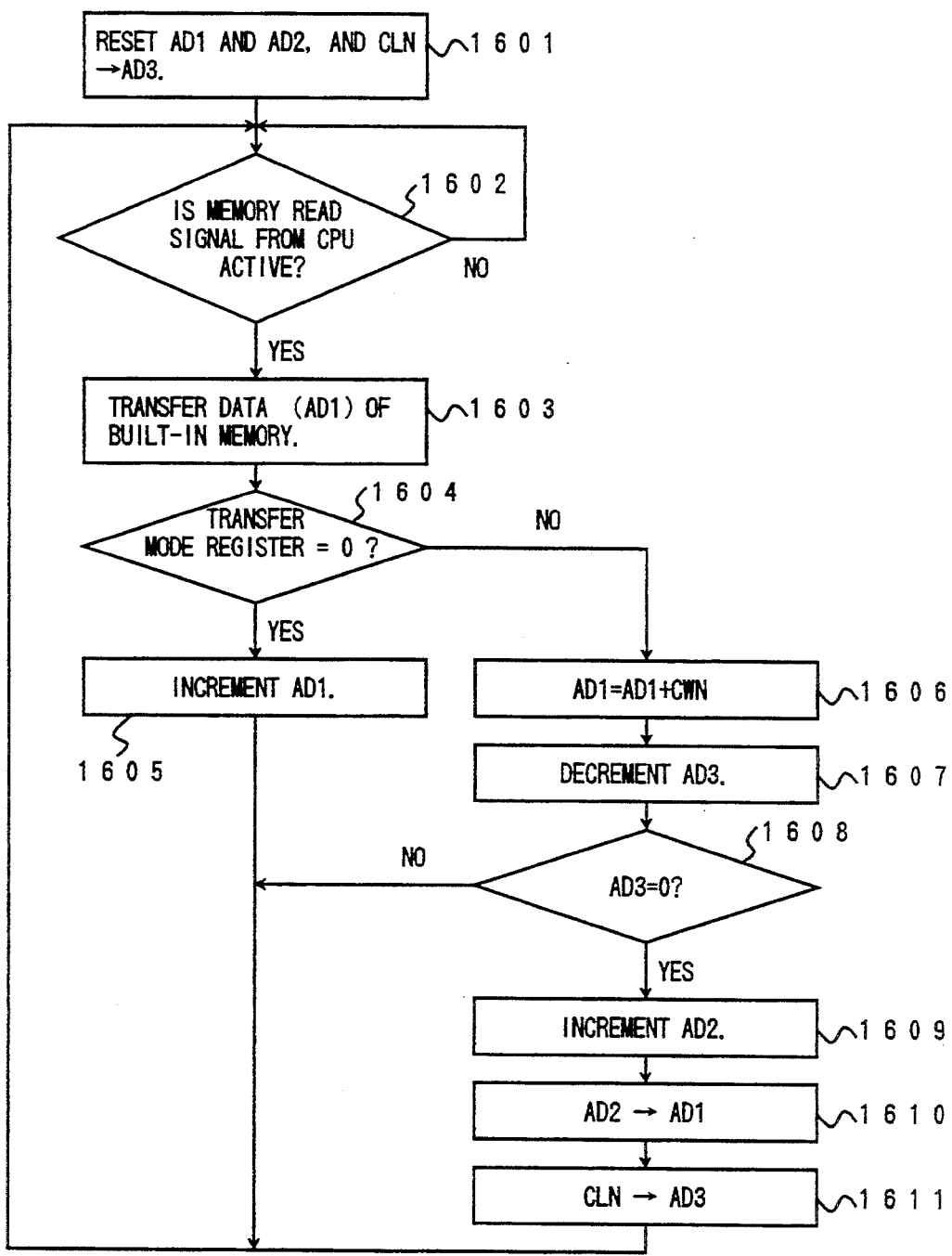
FIG. 16 is a flow chart showing the algorithm of the data transfer operation of the shading/transfer circuit.

Next, the operation in which the bit map data generated in the built-in memory 208 is transferred to the external memory 3 will be detailed in conjunction with a flow chart illustrated in FIG. 16.

It is supposed here that the address allocation of the bit map data generated in the built-in memory 208 is the same as the address allocation shown in FIG. 5.

If the LP has the address allocation in which the addresses are incremented in the X direction, "0" which is the value for designating the corresponding data transfer method is set in the transfer mode register 214 by the CPU 1, and if the LP has the address allocation in which the addresses are incremented in the Y direction, "1" which is the value for designating the corresponding data transfer method is set. Besides, the lateral number of words (CWN) of the character/pattern is set in the register CWN 1502, while the vertical number of lines (CLN) of the character/pattern is set in the register CLN 1503.

Referring to FIG. 16, the controller 213 of the shading/transfer circuit 209 first resets the registers AD1 (1504) and AD2 (1505) and sets the value of the register CLN 1503 (the vertical number of lines (CLN) of the character/pattern) in the register AD3 (1506) (step 1601).

Subsequently, when a memory read signal delivered from the CPU 1 has become active (step 1602), the shading/transfer controller 213 fetches data from the built-in memory 208 by using the value of the register AD1 (1504) as a fetch address and transfers the data to the external memory 3 through the shading/transfer bus A (step 1603). If the output memory read signal of the CPU 1 is nonactive (step 1602), the controller 213 waits with the state left intact.

Next, if the value of the transfer mode register 214 is "0" (step 1604), the address allocation in which the addresses are incremented in the X direction is assumed, and hence, the value of the register AD1 (1504) is incremented (step 1605). Specifically, the value of the register AD1 (1504) is sent to the adder/subtracter 1508 through the shading/transfer bus A, "1" is sent to the adder/subtracter 1508 through the selector 1507, the sent values are added by the adder/subtracter 1508 so as to store the result of the addition in the latch 1509, and the value stored in the latch 1509 is set in the register AD1 (1504) through the shading/transfer bus A.

In contrast, unless the value of the transfer mode register 214 is "0" (step 1604), the address allocation in which the addresses are incremented in the Y direction is assumed, and hence, the value of the register CWN 1502 (the lateral number of words (CWN) of the character/pattern) is added to the value of the register AD1 (1504) (step 1606). Specifically, the value of the register AD1 (1504) is sent to the adder/subtracter 1508 through the shading/transfer bus A, the value of the register CWN 1502 is sent to the adder/subtracter 1508 through a shading/transfer bus B and the selector 1507, the sent values are added by the adder/subtracter 1508 so as to store the result of the addition in the latch 1509, and the value stored in the latch 1509 is set in the register AD1 (1504) through the shading/transfer bus A.

At the next step, the value of the register AD3 (1506) is decremented (step 1607). Specifically, the value of the register AD3 (1506) is sent to the adder/subtracter 1508 through the shading/transfer bus A, "1" is sent to the adder/subtracter 1508 through the selector 1507, the latter is subtracted from the former by the adder/subtracter 1508 so as to store the result of the subtraction in the latch 1509, and the value stored in the latch 1509 is set in the register AD3 (1506) through the shading/transfer bus A.

Then, when the value of the register AD3 (1506) has become "0" as the result of the decrementing of the value of this register AD3 (1506) (step 1608), that is, when the output value of the adder/subtracter 1508 has become "0", a value to that effect is set in the register 1501. If the value of the register 1501 is "0", the shading/transfer controller 213 sequentially produces control signals required for executing the processing of steps 1609~1611.

More specifically, the value of the register AD2 (1505) is first incremented (step 1609). To effect this, the value of the register AD2 (1505) is sent to the adder/subtracter 1508 through the shading/transfer bus A, "1" is sent to the adder/subtracter 1508 through the selector 1507, the sent values are added by the adder/subtracter 1508 so as to store the result of the addition in the latch 1509, and the value stored in the latch 1509 is set in the register AD2 (1505) through the shading/transfer bus A.

Subsequently, the value of the register AD2 (1505) is set in the register AD1 (1504) (step 1610). Specifically, the value of the register AD2 (1505) is set in the register AD1 (1504) through the shading/transfer bus A.

Subsequently, the value of the register CLN 1503 (the vertical number of lines (CLN)) is set in the register AD3 (1506) (step 1611). Specifically, the value of the register CLN 1503 is set in the register AD3 (1506) through the shading/transfer bus A.

Incidentally, the operations of the step 1602 et seq. are repeated in a case where the value of the register AD3 (1506) is not "0" at the step 1608, in a case where the processing of the step 1611 has ended, or in a case where the processing of the step 1605 has ended.

By executing the steps 1601~1611, the bit map data generated in the built-in memory 208 can be transferred in accordance with the address allocation of the LP in both the case of the LP address allocation in which the addresses are incremented in the X direction and the case of the LP address allocation in which the addresses are incremented in the Y direction.

Incidentally, in the case of employing the TTP as the output engine 4, addresses may be successively incremented in the operation in which the bit map data generated in the built-in memory 208 is transferred to the external memory 3. Therefore, the CPU 1 may set the value of the transfer mode register 214 to "0" as in the case of the LP which assumes the address allocation shown in FIG. 5.

Here in the illustrated algorithm, the "0" value of the transfer mode register 214 corresponds to the LP address allocation in which the addresses are incremented in the X direction, and the nonzero value thereof corresponds to the LP address allocation in which the addresses are incremented in the Y direction. Needless to say, however, the relationship may well be reversed.

Besides, here in the illustrated case, the unit of the data transfer from the built-in memory 208 to the external memory 3 is the word unit. Needless to say, however, even when the data transfer is in byte units, the embodiment is applicable by replacing the lateral number of words with the lateral number of bytes.

Further, regarding the judgement of the CPU 1 for setting "0" or "1" in the transfer mode register 214, there are a case where the software for controlling the operation of the output engine 4 designates the register value, a case where the user directly designates the register value with the input unit such as keyboard 6, and so forth. Alternatively, when the use of the information processing system is restricted to one sort of output engine 4, only one value of the transfer mode register 214 may well be fixedly designated.

Still further, the circuit arrangement of the shading/transfer circuit 209 stated above is a mere example. Needless to say, the present invention is applicable even when the shading/transfer circuit 209 has a different circuit arrangement.

This embodiment has referred to the case where the character/pattern generator 5 is contrived as to the schemes for updating transfer addresses and where it transfers the bit map data generated in the built-in memory 208, to the external memory 3. However, there is also considered an embodiment in which the CPU 1 is contrived as to schemes for updating transfer addresses and in which it transfers the bit map data transferred to the external memory 3, to the output engine 4. In this case, the character/pattern generator 5 transfers the bit map data generated in the built-in memory 208, to the external memory 3 while merely incrementing the addresses.

Now, such an embodiment will be described with reference to FIGS. 17 and 18.

According to this embodiment, the CPU 1 is furnished with two sorts of address update schemes; an address update scheme in a data transfer mode in the case of the address allocation in which the addresses are incremented in the X direction, and an address update scheme in a data transfer mode in the case of the address allocation in which the addresses are incremented in the Y direction. Therefore, the shading/transfer circuit 209 needs only to transfer the bit map data generated in the built-in memory 208, to the external memory 3 while merely incrementing the addresses. In consequence, the transfer mode register 214 is dispensed with.

FIG. 17 is a flow chart showing the algorithm of the data transfer operation of the CPU 1 in the case where the LP assuming the address allocation depicted in FIG. 5 is employed as the output engine 4.

Here, symbols AR1, AR2 and AR3 denote registers included within the CPU 1. The values of the lateral number of words and the vertical number of lines of the external memory 3 shall be set in the internal registers of the CPU 1.

Referring to FIG. 17, the CPU 1 first resets the registers AR1 and AR2 and sets the lateral number of words of the external memory 3 in the register AR3 (step 1701). At the next step, the CPU 1 transfers bit map data stored in the external memory 3, to the output engine 4 by using the value of the register AR1 as an address (step 1702).

In the case where the LP of the address allocation shown in FIG. 5 is employed as the output engine 4, the address allocation of incrementing the addresses in the X direction is required of the bit map data which is to be stored in the external memory 3. In a case where the character/pattern generator 5 generates the bit map data in the address allocation of incrementing the addresses in the X direction, the CPU 1 can properly transfer the stored bit map data of the external memory 3 while merely incrementing the addresses. However, in a case where the character/pattern generator 5 generates the bit map data in the address allocation of incrementing the addresses in the Y direction, the CPU 1 cannot properly transfer the stored bit map data of the external memory 3 by merely incrementing the addresses.

Therefore, on condition that the address allocation of the bit map data stored in the external memory 3 is identical to the required address allocation (step 1703), the CPU 1 increments the value of the register AR1 (step 1704) so as to repeat the operations of the step 1702 et seq. That is, the CPU 1 transfers the bit map data while merely incrementing the addresses.

In contrast, if the address allocation of the data stored in the external memory 3 is different from the required address allocation (step 1703), for example, if it is the address allocation of incrementing the addresses in the Y direction, the data cannot be properly transferred by merely incrementing the addresses. Therefore, the vertical number of lines of the external memory 3 is added to the value of the register AR1 (step 1705). Subsequently, the value of the register AR3 is decremented (step 1706). If the value of the register AR3 becomes "0" here (step 1707), the value of the register AR2 is incremented (step 1708), and the incremented value is put into the register AR1 (step 1709). Subsequently, the lateral number of words of the external memory 3 is put into the register AR3 (step 1710). Thereafter, the operations of the step 1702 et seq. are repeated.

By executing the steps 1701~1710, the bit map data stored in the external memory 3 can be transferred in a sequence conforming to the address allocation of the output engine 4, irrespective of whether the address allocation of the stored bit map data is identical to or different from the required address allocation.

Figure 18:
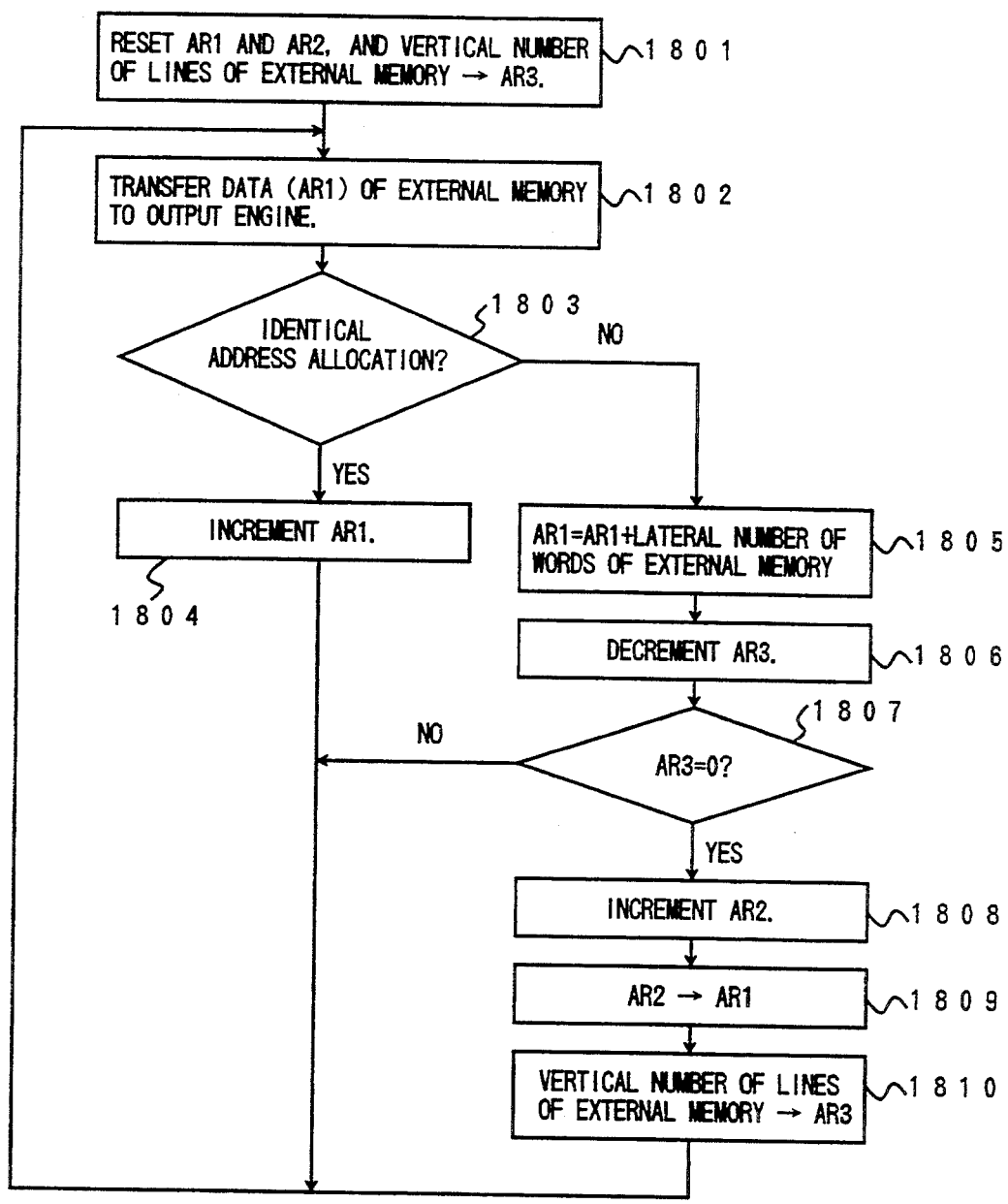
FIG. 18 is a flow chart showing another example of the algorithm of the data transfer operation of the CPU.

FIG. 18 is a flow chart showing the algorithm of the data transfer operation of the CPU 1 in the case where the LP assuming the address allocation depicted in FIG. 6 is employed as the output engine 4.

Here, symbols AR1, AR2 and AR3 denote registers included within the CPU 1. The values of the lateral number of words and the vertical number of lines of the external memory 3 shall be set in the internal registers of the CPU 1.

Referring to FIG. 18, the CPU 1 first resets the registers AR1 and AR2 and sets the vertical number of lines of the external memory 3 in the register AR3 (step 1801). At the next step, the CPU 1 transfers bit map data stored in the external memory 3, to the output engine 4 by using the value of the register AR1 as an address (step 1802).

In the case where the LP of the address allocation shown in FIG. 6 is employed as the output engine 4, the address allocation of incrementing the addresses in the Y direction is required of the bit map data which is to be stored in the external memory 3. In a case where the character/pattern generator 5 generates the bit map data in the address allocation of incrementing the addresses in the Y direction, the CPU 1 can properly transfer the stored bit map data of the external memory 3 while merely incrementing the addresses. However, in a case where the character/pattern generator 5 generates the bit map data in the address allocation of incrementing the addresses in the X direction, the CPU 1 cannot properly transfer the stored bit map data of the external memory 3 by merely incrementing the addresses. Therefore, on condition that the address allocation of the bit map data stored in the external memory 3 is identical to the required address allocation (step 1803), the CPU 1 increments the value of the register AR1 (step 1804) so as to repeat the operations of the step 1802 et seq. That is, the CPU 1 transfers the bit map data while merely incrementing the addresses.

In contrast, if the address allocation of the data stored in the external memory 3 is different from the required address allocation (step 1803), for example, if it is the address allocation of incrementing the addresses in the X direction, the data cannot be properly transferred by merely incrementing the addresses. Therefore, the lateral number of words of the external memory 3 is added to the value of the register AR1 (step 1805). Subsequently, the value of the register AR3 is decremented (step 1806). If the value of the register AR3 becomes "0" here (step 1807), the value of the register AR2 is incremented (step 1808), and the incremented value is put into the register AR1 (step 1809). Subsequently, the vertical number of lines of the external memory 3 is put into the register AR3 (step 1810). Thereafter, the operations of the step 1802 et seq. are repeated.

By executing the steps 1801~1810, the bit map data stored in the external memory 3 can be transferred in a sequence conforming to the address allocation of the output engine 4, irrespective of whether the address allocation of the stored bit map data is identical to or different from the required address allocation.

As stated above, the CPU 1 has the address update scheme illustrated in FIG. 17 and the address update scheme illustrated in FIG. 18. The CPU 1 transfers the stored bit map data of the external memory 3 to the output engine 4 by the address update scheme of FIG. 17 in the case where the output engine 4 is the LP assuming the address allocation shown in FIG. 5, and it transfers the stored bit map data of the external memory 3 to the output engine 4 by the address update scheme of FIG. 18 in the case where the output engine 4 is the LP assuming the address allocation shown in FIG. 6.

Incidentally, in the case of employing the TTP as the output engine 4, the CPU 1 may transfer the stored bit map data of the external memory 3 to the output engine 4 by the address update scheme shown in FIG. 17, as in the case of the LP which assumes the address allocation depicted in FIG. 5.

Here, regarding the judgement of the CPU 1 on either of the address update schemes to be used in the data transfer, there are a case where the software for controlling the operation of the output engine 4 designates the address update scheme, a case where the user directly designates the address update scheme with the input unit such as keyboard 6, and so forth. Alternatively, when the use of the information processing system is restricted to one sort of output engine 4, only one address update scheme may well be fixedly designated.

Further, with either of the address update schemes, regarding the judgement of the CPU 1 on whether the character/pattern generator 5 generates the bit map data in the address allocation of incrementing the addresses in the X direction or the bit map data in the address allocation of incrementing the addresses in the Y direction, there are a case where the software for controlling the operation of the output engine 4 designates the address allocation, a case where the user directly designates the address allocation with the input unit such as keyboard 6, and so forth.

As thus far described, according to any of the foregoing embodiments, one character/pattern generator 5 can be applied to various output engines 4.

Methods of application include a case of using the character/pattern generator 5 exclusively for either of an LP and a TTP, and a case of using it for both the LP and the TTP.

In the case of using the character/pattern generator 5 exclusively for either of the LP and the TTP, the CPU 1 operates as follows in printing bit map data: The CPU 1 discriminates the the output engine 4 type, and it sets values corresponding to the output engine 4 type, in a coordinate transformation mode register 210 and a transfer mode register 214. Alternatively, after discriminating the sort of output engine 4, the CPU 1 sets the elements of a 3×3 coordinate transformation matrix corresponding to sort of the output engine 4, or it transfers the bit map data stored in an external memory 3, to the output engine 4 by the use of an address update scheme corresponding to sort of the output engine 4.

On the other hand, in the case of using the character/pattern generator 5 for both the LP and the TTP, the user of an information processing system selects and instructs either of the LP and the TTP by the use of a keyboard or the like in instructing the print operation. Then, the CPU 1 discriminates the sort of the selected and instructed output engine 4, and it sets values corresponding to the sort of output engine 4, in the coordinate transformation mode register 210 and the transfer mode register 214. Alternatively, after discriminating the sort of output engine 4, the CPU 1 sets the elements of a 3×3 coordinate transformation matrix corresponding to the sort of output engine 4, or it transfers the bit map data stored in the external memory 3, to the output engine 4 by the use of an address update scheme corresponding to the sort of output engine 4.

Besides, although any of the embodiments has a construction in which the output engine 4 and the external memory 3 are separated, the output engine 4 and the external memory 3 can also be integrated into a single output unit. In such a case, a shading/transfer circuit 209 transfers the bit map data generated in a built-in memory 208, directly to the output unit.

The embodiments have been described as to cases where the output engine 4 is the printer such as LP or TTP. However, the present invention is also applicable to a case where the output engine is a display unit. It is also applicable to a case where both the printer and the display unit are connected.

What is claimed is:

1. In a character/pattern generator wherein at least either items of characters and patterns are to be processed, and wherein bit map data expressing any of the items in a dot form is generated from vector data which is outline information expressing an outline of the item in a vector form and is delivered as an output:
  a character/pattern generator comprising:
  coordinate transformation means for coordinate-transforming said vector data;
  bit map data generation means for generating said bit map data of said dot form from the vector data coordinate transformed by said coordinate transformation means;
  said coordinate transformation means including a coordinate transformation function of subjecting said vector data to any of at least two sorts of coordinate transformations by the use of coordinate transformation parameters externally given from an associated processor unit, and a coordinate transformation selection function of selecting any of said at least two sorts of coordinate transformations on the basis of information externally given;

a coordinate transformation circuit which coordinate-transforms said vector data, the coordinate transformation circuit including, a coordinate transformation mode register in which a value for designating a coordinate transformation method is set from an associated processor unit, a coordinate transformation execution unit which executes coordinate transformation calculations in conformity with the designated coordinate transformation method, and a coordinate transformation controller which controls the operation of said coordinate transformation circuit;

memory means for storing the coordinate transformation parameters received from the associated processor unit; wherein said coordinate transformation function includes, at least, a case where the coordinate transformation represented by:

$$efunc \begin{pmatrix} X' \\ Y' \\ 1 \end{pmatrix} = \begin{pmatrix} a & b & tx \\ c & d & ty \\ 0 & 0 & 1 \end{pmatrix} \begin{pmatrix} X \\ Y \\ 1 \end{pmatrix}$$

(where X and Y denote coordinate values before said coordinate transformation, while X' and Y' denote coordinate values after said coordinate transformation as correspond to said values X and Y, respectively) is performed by the use of the following coordinate transformation parameters externally given:

$$\begin{pmatrix} a & b & tx \\ c & d & ty \\ 0 & 0 & 1 \end{pmatrix}$$

and a case where the coordinate transformation represented by:

$$\begin{pmatrix} X' \\ Y' \\ 1 \end{pmatrix} = \begin{pmatrix} c & d & ty \\ a & b & tx \\ 0 & 0 & 1 \end{pmatrix} \begin{pmatrix} X \\ Y \\ 1 \end{pmatrix}$$

(where X and Y denote coordinate values before said coordinate transformation, while X' and Y' denote coordinate values after said coordinate transformation as correspond to said values X and Y, respectively) is performed by the use of the following coordinate transformation parameters externally given:

$$\begin{pmatrix} c & d & ty \\ a & b & tx \\ 0 & 0 & 1 \end{pmatrix}$$

a central processing unit, and at least one sort of output engine;

said central processor unit including information bestowal means for giving said character/pattern generator the information which corresponds to an address allocation of said output engine to-be-used;

said coordinate transformation selection function selecting any of said at least two sorts of coordinate transformations on the basis of said information given by said information bestowal means; and a coordinate transformation execution unit including, a first register file in which coordinate transformation parameters are stored, a second register file in which coordinate transformation parameters are stored, a multiplier which multiplies the coordinate value stored in said first register file and the corresponding coordinate transformation parameter stored in said second register file, a first latch circuit and a second latch circuit in which multiplication results of said multiplier are accumulated, an adder/subtracter which executes a first addition/subtraction between the content of said first latch circuit and that of said second latch circuit, and a second addition/subtraction between a last addition/subtraction result and the corresponding coordinate transformation parameter stored in said second register file, selectors which select either of said first addition/subtraction and said second addition/subtraction so as to execute the selected addition/subtraction by means of said adder/subtracter, a third latch circuit which stores a result of said addition/subtraction of said adder/subtracter, and local biases which connect the aforementioned constituents.

2. In an information processing system having, at least, a character/pattern generator wherein at least either items of characters and patterns are to be processed, and wherein bit map data expressing any of the items in a dot form is generated from vector data which is outline information expressing an outline of the item in a vector form and is delivered as an output, a central processing unit which executes information processing, a coordinate transformation execution unit and at least one sort of output engine; an information processing system wherein:

said coordinate transformation execution unit includes:

a first register file in which coordinate values to be coordinate-transformed are stored;

a second register file in which coordinate transformation parameters are stored;

a multiplier which multiplies the coordinate value stored in said first register file and the corresponding coordinate transformation parameter stored in said second register file;

a first latch circuit and a second latch circuit in which multiplication results of said multiplier are accumulated;

an adder/subtracter which executes a first addition/subtraction between the content of said first latch circuit and that of said second latch circuit, and a second addition/subtraction between a last addition/subtraction result and the corresponding coordinate transformation parameter stored in said second register file;

selectors which select either of said first addition/subtraction and said second addition/subtraction so as to execute the selected addition/subtraction by means of said adder/subtracter;

a third latch circuit which stores a result of said addition/subtraction of said adder/subtracter; and local buses which connect the aforementioned constituents;

said character/pattern generator comprises:

coordinate transformation means for coordinate-transforming said vector data;

memory means for storing coordinate transformation parameters dictating a coordinate transforming operation of the coordinate transformation means;

means for accepting a designation of said output engine to-be-used; and bit map data generation means for generating said bit map data of said dot form from the vector data coordinate-transformed by said coordinate transformation means; and said central processor unit comprises:

coordinate transformation parameter bestowal means for communicating said coordinate transformation means coordinate transformation parameters which correspond to an address allocation of said output engine to-be-used to the memory means of the character/pattern generator.

3. An information processing system as defined in claim 2, wherein:

said coordinate transformation means includes, at least, a case where the coordinate transformation represented by:

$$\begin{pmatrix} X' \\ Y' \\ 1 \end{pmatrix} = T \begin{pmatrix} X \\ Y \\ 1 \end{pmatrix}$$

(where X and Y denote coordinate values before said coordinate transformation, while X' and Y' denote coordinate values after said coordinate transformation as correspond to said values X and Y, respectively), is performed by the use of a 3×3 coordinate transformation matrix T as the coordinate transformation parameters given:

said coordinate transformation parameter bestowal means includes, at least, a case of giving the following coordinate transformation parameters:

$$T = \begin{pmatrix} a & b & tx \\ c & d & ty \\ 0 & 0 & 1 \end{pmatrix};$$

and a case of giving the following coordinate transformation parameters:

$$T = \begin{pmatrix} c & d & ty \\ a & b & tx \\ 0 & 0 & 1 \end{pmatrix}.$$

4. In an information processing system having, at least, a character/pattern generator wherein at least either items of characters and patterns are to be processed, and wherein bit map data expressing any of the items in a dot form is generated from vector data which is outline information expressing an outline of the item in a vector form and is delivered as an output, a central processing unit which executes information processing, a coordinate transformation execution unit and at least one sort of output engine;

an information processing system wherein:

said character/pattern generator comprises:

coordinate transformation means for coordinate transforming said vector data;

bit map data generation means for generating said bit map data of said dot form from the vector data coordinate transformed by said coordinate transformation means;

memory means for storing therein said bit map data generated by the dot data generation means;

a coordinate transformation circuit which coordinate-transforms said vector data; and transfer means for externally transferring said bit map data stored in said memory means;

said central processor unit comprises:

a function of causing said bit map data generation means to generate bit map data items from respective vector data items in two or more divided subregions of a region of said vector data which has been divided in generating the bit map data in order to generate the bit map data having a size larger than a storage capacity of said memory means;

said coordinate transformation execution unit includes:

a first register file in which coordinate values to be coordinate-transformed are stored;

a second register file in which coordinate transformation parameters are stored;

a multiplier which multiplies the coordinate value stored in said first register file and the corresponding coordinate transformation parameter stored in said second register file;

a first latch circuit and a second latch circuit in which multiplication results of said multiplier are accumulated;

an adder/subtracter which executes a first addition/subtraction between the content of said first latch circuit and that of said second latch circuit, and a second addition/subtraction between a last addition/subtraction result and the corresponding coordinate transformation parameter stored in said second register file;

selectors which select either of said first addition/subtraction and said second addition/subtraction so as to execute the selected addition/subtraction by means of said adder/subtracter;

a third latch circuit which stores a result of said addition/subtraction of said adder/subtracter; and local buses which connect the aforementioned constituents; and said function of said central processor unit for said bit map data generation includes:

regional division means for performing either of two sorts of regional divisions;

a regional division in which said region of said vector data is divided in a horizontal direction in data transfer unit of said transfer means, and a regional division in which said region of said vector data is divided in a vertical direction; and regional division selection means for selecting either of said two sorts of regional divisions in correspondence with an address allocation of said output engine to-be-used.

5. The information processing system of claim 4, wherein:
coordinate values (X, Y) are externally set as said coordinate values in said first register file, while coordinate transformation parameters a, b, c, d, tx and ty are set as said coordinate transformation parameters in said second register file; and
said coordinate transformation controller causes said coordinate transformation execution unit to execute the calculation of either of the following equations in accordance with the set value of said coordinate transformation mode register by the use of said multiplier, said adder/subtracter, said first, second and third latch circuits, and said selectors:

$$\begin{pmatrix} X' \\ Y' \\ 1 \end{pmatrix} = \begin{pmatrix} a & b & tx \\ c & d & ty \\ 0 & 0 & 1 \end{pmatrix} \begin{pmatrix} X \\ Y \\ 1 \end{pmatrix}$$

$$\begin{pmatrix} X' \\ Y' \\ 1 \end{pmatrix} = \begin{pmatrix} c & d & ty \\ a & b & tx \\ 0 & 0 & 1 \end{pmatrix} \begin{pmatrix} X \\ Y \\ 1 \end{pmatrix}$$

6. In a character/pattern generator wherein at least either items of characters and patterns are to be processed, and wherein bit map data expressing any of the items in a dot form is generated from vector data which is outline information expressing an outline of the item in a vector form and is delivered as an output;
a character/pattern generator comprising:
coordinate transformation means for coordinate transforming said vector data;
bit map data generation means for generating said bit map data of said dot form from the vector data coordinate transformed by said coordinate transformation means;
memory means for storing therein said bit map data generated by the dot data generation means; and
transfer means for externally transferring said bit map data stored in said memory means;
a coordinate transformation execution unit including:
a first register file in which coordinate values to be coordinate-transformed are stored;
a second register file in which coordinate transformation parameters are stored;
a multiplier which multiplies the coordinate value stored in said first register file and the corresponding coordinate transformation parameter stored in said second register file;
a first latch circuit and a second latch circuit in which multiplication results of said multiplier are accumulated;
an adder/subtracter which executes a first addition/subtraction between the content of said first latch circuit and that of said second latch circuit, and a second addition/subtraction between a last addition/subtraction result and the corresponding coordinate transformation parameter stored in said second register file;
selectors which select either of said first addition/subtraction and said second addition/subtraction so as to execute the selected addition/subtraction by means of said adder/subtracter;
a third latch circuit which stores a result of said addition/subtraction of said adder/subtracter; and
local buses which connect the aforementioned constituents;
said transfer means including:
an address update function of updating addresses in conformity with any of at least two address update schemes in transferring said bit map data stored in said memory means; and
an address update selection function of selecting any of said at least two sorts of address update schemes on the basis of information received from an associated processor unit.

7. An information processing system comprising, at least, said character/pattern generator as defined in claim 6, a central processing unit which executes information processing, and at least one sort of output engine;
said central processor unit including information bestowal means for giving said character/pattern generator the information which corresponds to an address allocation of said output engine to-be-used;
said address update selection function selecting any of said at least two sorts of address update schemes on the basis of said information given by said information bestowal means.

8. The information processing system of claim 6, wherein:
coordinate values (X, Y) are externally set as said coordinate values in said first register file, while coordinate transformation parameters a, b, c, d, tx and ty are set as said coordinate transformation parameters in said second register file; and
said coordinate transformation controller causes said coordinate transformation execution unit to execute the calculation of either of the following equations in accordance with the set value of said coordinate transformation mode register by the use of said multiplier, said adder/subtracter, said first, second and third latch circuits, and said selectors:

$$\begin{pmatrix} X' \\ Y' \\ 1 \end{pmatrix} = \begin{pmatrix} a & b & tx \\ c & d & ty \\ 0 & 0 & 1 \end{pmatrix} \begin{pmatrix} X \\ Y \\ 1 \end{pmatrix}$$

$$\begin{pmatrix} X' \\ Y' \\ 1 \end{pmatrix} = \begin{pmatrix} c & d & ty \\ a & b & tx \\ 0 & 0 & 1 \end{pmatrix} \begin{pmatrix} X \\ Y \\ 1 \end{pmatrix}$$

9. The information processing system of claim 8 wherein the transfer means includes
a shading/transfer execution unit including:
a first register in which the lateral number of word of said each character/pattern is set;
a second register in which the vertical number of lines of said each character/pattern is set;
a register in which an address for accessing a built-in memory, for storing said bit map data therein, is stored;
an adder/subtracter which calculates an address of a transfer destination; and a shading/transfer circuit which generates said bit map data of said dot form from the vector data coordinate transformed by said coordinate transformation circuit, and which transfers the generated bit map data externally to an associated memory means.

10. The information processing system as defined in claim 9 including a central processing unit which executes information processing, and at least one sort of output engine;
said central processor unit including information bestowal means for giving said character/pattern generator the information which corresponds to an address allocation of said output engine to-be-used;
said address update selection function selecting any of said at least two sorts of address update schemes on the basis of said information given by said information bestowal means.

11. The information processing system of claim 10 further comprising:
an information processing system wherein:
said character/pattern generator comprises:
coordinate transformation means for coordinate-transforming said vector data;
bit map data generation means for generating said bit map data of said dot form from the vector data coordinate-transformed by said coordinate transformation means;
memory means for storing therein said bit map data generated by the dot data generation means; and
transfer means for transferring said bit map data stored in said memory means, to said external memory;
said central processor unit includes a transfer control function of transferring the bit map data stored in said external memory, to said output engine to-be-used;
a coordinate transformation circuit which coordinate-transforms said vector data including,
a coordinate transformation mode register in which a value for designating a coordinate transformation method is set from an associated processor unit,
a coordinate transformation execution unit which executes coordinate transformation calculations in conformity with the designated coordinate transformation method, and
a coordinate transformation controller which controls the operation of said coordinate transformation circuit; and
coordinate transformation execution unit including,
a first register file in which coordinate values to be coordinate-transformed are stored,
a second register file in which coordinate transformation parameters are stored,
a multiplier which multiplies the coordinate value stored in said first register file and the corresponding coordinate transformation parameter stored in said second register file,
a first latch circuit and a second latch circuit in which multiplication results of said multiplier are accumulated,
an adder/subtracter which executes a first addition/subtraction between the content of said first latch circuit and that of said second latch circuit, and a second addition/subtraction between a last addition/subtraction result and the corresponding coordinate transformation parameter stored in said second register file,
selectors which select either of said first addition/subtraction and said second addition/subtraction so as to execute the selected addition/subtraction by means of said added/subtracter,
a third latch circuit which stores a result of said addition/subtraction of said adder/subtracter, and
local buses which connect the aforementioned constituents.

12. An information processing system as defined in claim 11, further comprising means for accepting a designation of said output engine to-be-used.

13. In an information processing system having, at least, a character/pattern generator wherein at least either items of characters and patterns are to be processed, and wherein bit map data expressing any of the items in a dot form is generated from vector data which is outline information expressing an outline of the item in a vector form and is delivered as an output, a central processing unit which executes information processing, an external memory, and at least one sort of output engine;
an information processing system wherein:
said character/pattern generator comprises:
coordinate transformation means for coordinate-transforming said vector data;
bit map data generation means for generating said bit map data of said dot form from the vector data coordinate-transformed by said coordinate transformation means;
memory means for storing therein said bit map data generated by the dot data generation means; and
transfer means for transferring said bit map data stored in said memory means, to said external memory; and
said central processor unit includes a transfer control function of transferring the bit map data stored in said external memory, to said output engine to-be-used;
said coordinate transformation means includes a coordinate transform execution unit including:
a first register file in which coordinate values to be coordinate-transformed are Stored;
a second register file in which coordinate transformation parameters are stored;
a multiplier which multiplies the coordinate value stored in said first register file and the corresponding coordinate transformation parameter stored in said second register file;
a first latch circuit and a second latch circuit in which multiplication results of said multiplier are accumulated;
an adder/subtracter which executes a first addition/subtraction between the content of said first latch circuit and that of said second latch circuit, and a second addition/subtraction between a last addition/subtraction result and the corresponding coordinate transformation parameter stored in said second register file;
selectors which select either of said first addition/subtraction and said second addition/subtraction so as to execute the selected addition/subtraction by means of said adder/subtracter;

a third latch circuit which stores a result of said addition/subtraction of said adder/subtracter; and local buses which connect the aforementioned constituents;

said transfer control function including an address update function of executing any of a plurality of sorts of address update schemes in transferring said bit map data stored in said external memory, to said output engine, and an address update selection function of selecting any of said plurality of sorts of address update schemes in accordance with an address allocation of said output engine to-be-used.

14. An information processing system as defined in claim 13, further comprising means for accepting a designation of said output engine to-be-used.

15. In a character/pattern generator wherein at least either items of characters and patterns are to be processed, and wherein bit map data expressing any of the items in a dot form is generated from vector data which is outline information expressing an outline of the item in a vector form and is delivered as an output, information processing system comprising:

a character/pattern generator comprising:

coordinate transformation means for coordinate-transforming said vector data;

bit map data generation means for generating said bit map data of said dot form from the vector data coordinate transformed by said coordinate transformation means;

said coordinate transformation means including, means for subjecting said vector data to any of at least two sorts of coordinate transformations by the use of coordinate transformation parameters externally given from an associated processor unit, means for selecting any of said at least two sorts of coordinate transformations on the basis of information externally given, a coordinate transformation mode register in which a value for designating a coordinate transformation method is set from an associated processor unit, a coordinate transformation execution unit which executes coordinate transformation calculations in conformity with the designated coordinate transformation method, and a coordinate transformation controller which controls the operation of said coordinate transformation circuit; and memory means for storing the coordinate transformation parameters received from the associated processor unit;

a central processor unit including information bestowal means for giving said character/pattern generator the information which corresponds to an address allocation of said output engine to-be-used;

said coordinate transformation selection function selecting any of said at least two sorts of coordinate transformations on the basis of said information given by said information bestowal means;

means for accepting a designation of said output engine to-be-used; and coordinate transformation execution unit including, a first register file in which coordinate values to be coordinate-transformed are stored, a second register file in which coordinate transformation parameters are stored, a multiplier which multiplies the coordinate value stored in said first register file and the corresponding coordinate transformation parameter stored in said second register file, a first latch circuit and a second latch circuit in which multiplication results of said multiplier are accumulated, an adder/subtracter which executes a first addition/subtraction between the content of said first latch circuit and that of said second latch circuit, and a second addition/subtraction between a last addition/subtraction result and the corresponding coordinate transformation parameter stored in said second register file, selectors which select either of said first addition/subtraction and said second addition/subtraction so as to execute the selected addition/subtraction by means of said adder/subtracter, a third latch circuit which stores a result of said addition/subtraction of said adder/subtracter, and local buses which connect the aforementioned constituents.

* * * * *

UNITED STATES PATENT AND TRADEMARK OFFICE
CERTIFICATE OF CORRECTION

PATENT NO. : 5,414,448
DATED : May 9, 1995
INVENTOR(S) : Hiroshi Wada, et al.

It is certified that error appears in the above-indentified patent and that said Letters Patent is hereby corrected as shown below:

Claim 9, column 28, lines 59-68, delete:

"a shading/transfer execution unit including:
a first register in which the lateral number of word of said each character/pattern is set;
a second register in which the vertical number of lines of said each character/pattern is set;
a register in which an address for accessing a built-in memory, for storing said bit map data therein, is stored;
an adder/subtracter which calculates an address of a transfer destination"

and substitute therefor:

--a coordinate transfer execution unit that includes:
a first register file in which coordinate values to be coordinate-transformed are stored;
a second register file in which coordinate transformation parameters are stored;
a multiplier which multiplies the coordinate value stored in said first register file and the corresponding coordinate transformation parameter stored in said second register file;
a first latch circuit and a second latch circuit in which multiplication results of said multiplier are accumulated;
an adder/subtracter which executes a first addition/substraction between the content of said first latch circuit and that of said second latch circuit, and a second addition/subtraction between a last addition/subtraction result and the corresponding coordinate transformation parameter stored in said second register file:
selectors which select either of said first addition/subtraction and said second addition/subtraction so as to execute the selected addition/subtraction by means of said adder/subtracter:
a third latch circuit which stores a result of said addition/subtraction of said adder/subtracter;
local buses which connect the aforementioned constituents--.

UNITED STATES PATENT AND TRADEMARK OFFICE
CERTIFICATE OF CORRECTION

PATENT NO. : 5,414,448
DATED : May 9, 1995
INVENTOR(S) : Hiroshi Wada, et. al.

It is certified that error appears in the above-indentified patent and that said Letters Patent is hereby corrected as shown below:

Claim 11, column 29, line 51, before "corrdinate" insert --a--.

Signed and Sealed this

Twenty-fourth Day of October, 1995

Attest:

BRUCE LEHMAN

Attesting Officer

Commissioner of Patents and Trademarks